(12) United States Patent
Tsuzuki et al.

(10) Patent No.: US 9,991,985 B2
(45) Date of Patent: Jun. 5, 2018

(54) OPTICAL TRANSMISSION CONTROL DEVICE AND OPTICAL SIGNAL WAVELENGTH DETERMINATION METHOD

(71) Applicant: FUJITSU LIMITED, Kawasaki-shi, Kanagawa (JP)

(72) Inventors: Tatsuya Tsuzuki, Kawasaki (JP); Tomoaki Takeyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/594,002

(22) Filed: May 12, 2017

(65) Prior Publication Data
US 2017/0338905 A1  Nov. 23, 2017

(30) Foreign Application Priority Data
May 18, 2016 (JP) ................. 2016-099973

(51) Int. Cl.
*H04J 14/00* (2006.01)
*H04J 14/02* (2006.01)
(Continued)

(52) U.S. Cl.
CPC .......... *H04J 14/0241* (2013.01); *H04L 45/22* (2013.01); *H04L 45/30* (2013.01);
(Continued)

(58) Field of Classification Search
CPC ............... H04J 14/0227; H04J 14/0241; H04J 14/0257; H04J 14/0268
See application file for complete search history.

(56) References Cited

U.S. PATENT DOCUMENTS

2006/0051093 A1  3/2006 Manna
2006/0203329 A1  9/2006 Nishihara et al.
(Continued)

FOREIGN PATENT DOCUMENTS

JP  2006-295113  10/2006
JP  2008-510388  4/2008

OTHER PUBLICATIONS

Giles et al., "Modeling Erbium-Doped Fiber Amplifiers", IEEE, Journal of Lightwave Technology. vol. 9, No. 2, pp. 271-283, Feb. 1991.
(Continued)

*Primary Examiner* — Daniel Dobson
(74) *Attorney, Agent, or Firm* — Staas & Halsey LLP

(57) ABSTRACT

There is provided an optical transmission control device includes a memory, and a processor coupled to the memory and the processor configured to aggregate information of candidacy sections having a possibility that communication is discontinued among wavelength-multiplexed transmission sections, classify, based on the aggregated information, optical paths set between optical transmission devices into a first optical path on which, when communication in the candidacy sections is discontinued, an optical signal is not transmitted, and a second optical path on which, when the communication in the candidacy sections is discontinued, an optical signal is transmitted, and determine a wavelength allocation in a first wavelength group of the first optical path and a second wavelength group of the second optical path so that a difference in gain wavelength characteristics of the first optical path and the second optical path is equal to or less than a predetermined level.

6 Claims, 26 Drawing Sheets

(51) Int. Cl.
- *H04Q 11/00* (2006.01)
- *H04L 12/725* (2013.01)
- *H04L 12/707* (2013.01)
- *H04B 10/00* (2013.01)

(52) U.S. Cl.
CPC ...... *H04Q 11/0066* (2013.01); *H04J 14/0212* (2013.01); *H04Q 2011/0016* (2013.01); *H04Q 2011/0086* (2013.01)

(56) References Cited

U.S. PATENT DOCUMENTS

2015/0244453 A1* 8/2015 Bottari .................... H04J 14/00
 398/5
2016/0316283 A1* 10/2016 Kim ................... H04J 14/0257

OTHER PUBLICATIONS

Bolshtyansky, "Spectral Hole Burning in Erbium-Doped Fiber Amplifiers", IEEE, Journal of Lightwave Technology, vol. 21, No. 4, pp. 1032-1038, Apr. 2003.

* cited by examiner

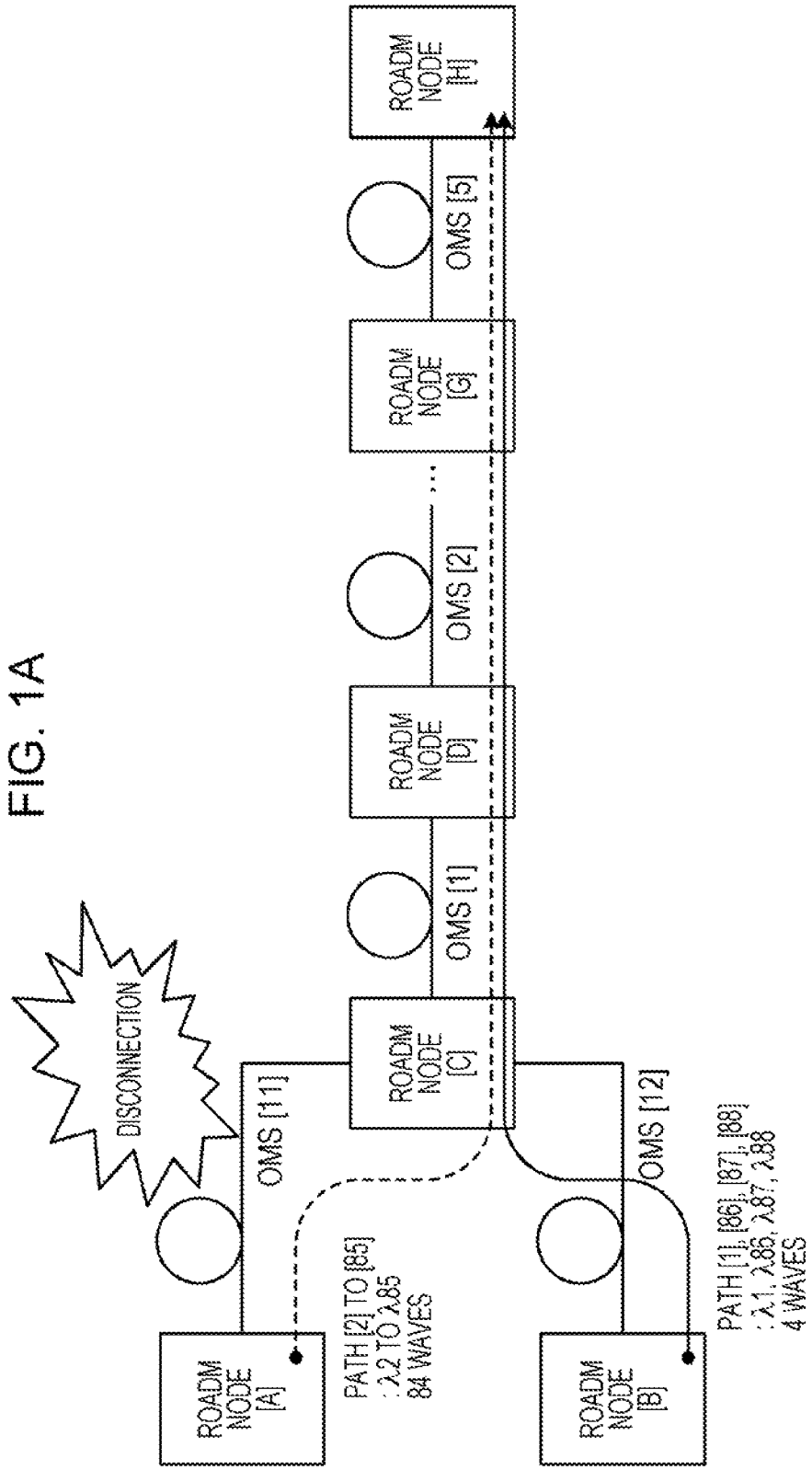

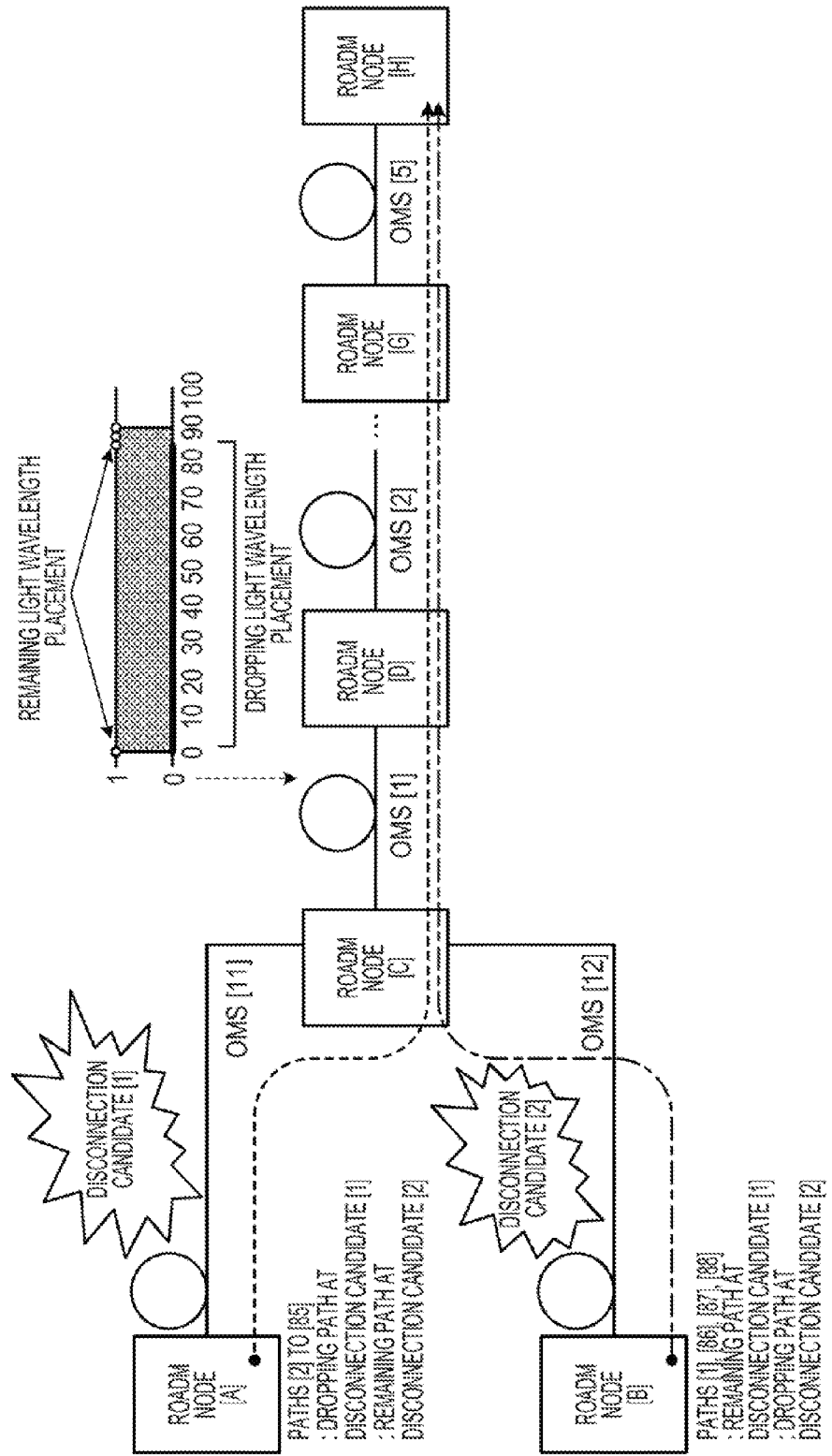

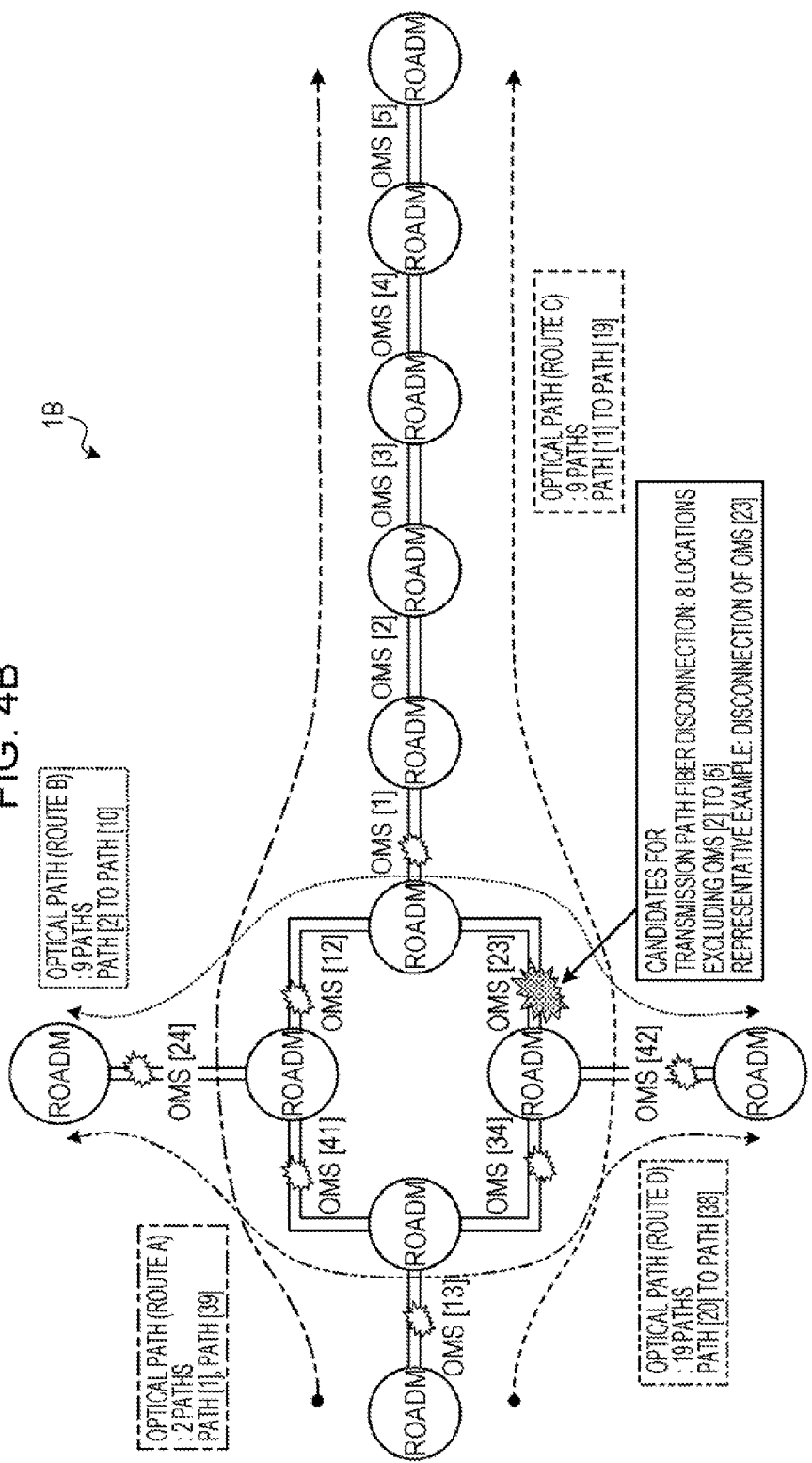

OPTICAL TRANSMISSION CONTROL DEVICE AND OPTICAL SIGNAL WAVELENGTH DETERMINATION METHOD

CROSS-REFERENCE TO RELATED APPLICATION

This application is based upon and claims the benefit of priority of the prior Japanese Patent Application No. 2016-099973, filed on May 18, 2016, the entire contents of which are incorporated herein by reference.

FIELD

The embodiment discussed herein relates to an optical transmission control device and an optical signal wavelength determination method.

BACKGROUND

Recently, WDM optical transmission systems that use wavelength division multiplexing (WDM) have become widespread. A WDM optical transmission system multiplexes and transmits a plurality of optical signals of different wavelengths. A reconfigurable optical add drop multiplexer (ROADM) is provided on a transmission line in the WDM optical transmission system. The ROADM branches (drops) the optical signals of a desired wavelength from the WDM signals and inserts (adds) the branched signals into empty channels in the WDM signals. The ROADM also includes an erbium-doped fiber amplifier (EDFA) for amplifying the optical signals.

An optical amplifier is provided in each node in order to compensate for loss in the transmission line and the ROADM in the WDM optical transmission system. The wavelength characteristics of the optical gain and the optical loss with respect to the WDM signal depend upon the wavelength allocation of the WDM signals. Therefore, a function for adjusting the optical power of each wavelength channel is provided in the WDM optical transmission system. This function is realized, for example, through an optical channel monitor (OCM) that detects the optical power in each wavelength channel and a wavelength selective switch (WSS) that adjusts the optical power in each wavelength channel. In this case, the optical power in each wavelength channel is controlled so that the optical power of an optical signal received by a receiving node is maintained within the receivable power range of the optical receiver.

When the wavelength allocations of the WDM signals are changed, the optical power in each wavelength channel temporarily fluctuates greatly thereby producing a gain ripple (variation of the optical gain with respect to the wavelength) in the EDFA. Consequently, the power of the optical signals arriving at the receiving node may beyond the receivable power limits of the optical receiver and an optical signal error may occur. This problem occurs when there is a large change in the optical gain wavelength characteristics caused by the changes in the wavelength allocation of the WDM signals.

One factor that leads to a gain ripple in the EDFA is spectrum hole burning (referred to below as SHB). SHB is produced when the optical signals pass through the EDFA. Specifically, when the optical signals pass through the EDFA, there is a decrease in the wavelengths of the optical signals and in the gain of the wavelengths in the proximity thereof.

Namely, the optical power in each wavelength channel fluctuates due to the changes in the shape (gain wavelength characteristics) of the gain ripple caused by the SHB following the changes in the wavelength allocation of the WDM signals. As a result, there is a possibility that an optical signal error may occur in a wavelength channel with a large fluctuation of the optical power.

Japanese Patent No. 4643645 proposes a technique which involves dividing the wavelength bands of the WDM signals into bands in which the optical power is changed based on the SHB when the number of signal wavelengths is low, and into other bands, and performing gain correction on the WDM signals based on the number of signal wavelengths in each band according to the result of monitoring the optical power in each band. Non-patent documents (1: C. Randy Giles, Emmanuel Desurvire, "Modeling Erbium-Doped Fiber Amplifiers", Journal of Lightwave Technology, vol. 9, no. 2, pp. 271-283 (1991); 2: Maxim Bolshtyansky, "Spectral Hole Burning in Erbium-Doped Fiber Amplifiers", Journal of Lightwave Technology, vol. 21, no. 4, pp. 1032-1038 (2003)) respectively describe the modeling of the EDFA and the phenomenon of spectral hole burning.

SUMMARY

According to a state of the invention, an optical transmission control device is configured to control an optical transmission system including optical transmission devices configured to wavelength-multiplex, amplify and transmit optical signals, and wavelength-multiplexed transmission sections through which the optical transmission devices are coupled, the optical transmission control device includes a memory, and a processor coupled to the memory and the processor configured to aggregate information of candidacy sections having a possibility that communication is discontinued among wavelength-multiplexed transmission sections, classify, based on the aggregated information, optical paths set between the optical transmission devices into a first optical path on which, when communication in the candidacy sections is discontinued, an optical signal of the optical signals is not transmitted, and a second optical path on which, when the communication in the candidacy sections is discontinued, an optical signal of the optical signals is transmitted, both of the first optical path and the second optical path being included in the optical paths set between the optical transmission devices, and determine a wavelength allocation in a first wavelength group of the first optical path and a second wavelength group of the second optical path so that a difference in gain wavelength characteristics of the first optical path and the second optical path is equal to or less than a predetermined level.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a view for explaining an example of a state of a change in the optical power due to an OMS disconnection of WDM multiplexed optical signals in an optical transmission system;

FIG. 2A is a view for explaining a state of wavelength allocation for limiting changes in a gain ripple shape following a change in the wavelength allocation in an optical transmission system;

FIG. 4B is a view for explaining a dropping path and a remaining path when an OMS disconnection occurs in the optical transmission system according to the embodiment;

DESCRIPTION OF EMBODIMENT

According to the above technique, a time period of, for example, several hundreds of milliseconds to several seconds is desired for monitoring the optical power and adjusting the gain of the optical power. As a result, there is a problem that optical signal errors caused by the change in the optical power following the change in the wavelength allocation are not be reduced without quickly adapting to the change of the wavelength allocation caused by a disconnection in an optical path and the like.

The following is an explanation of an embodiment of a technique for suppressing changes in the optical power following changes in the wavelength allocation and reducing optical signal errors with reference to the drawings. The following embodiment is not intended to limit the techniques disclosed herein. Moreover, the embodiment or another embodiment may be combined as appropriate within the scope of consistency. The explanation of the following embodiment merely discusses a configuration pertaining to the technique disclosed herein and explanations of other configurations may be omitted. In the following explanation of the embodiment, the explanation of overlapping or similar configurations or processing may be omitted.

[Gain Ripple Caused by Spectral Hole Burning and Changes in the Shape of the Gain Ripple]

The gain ripple caused by spectral hole burning (referred to below as SHB) and changes in the shape of the gain ripple following changes in the wavelength allocation in an optical transmission system will be explained before explaining the embodiment. In the following explanation, it is assumed that 88 wavelength channels (ch1-ch88) can be multiplexed into wavelength division multiplexing (WDM) signals.

Figure 1B:
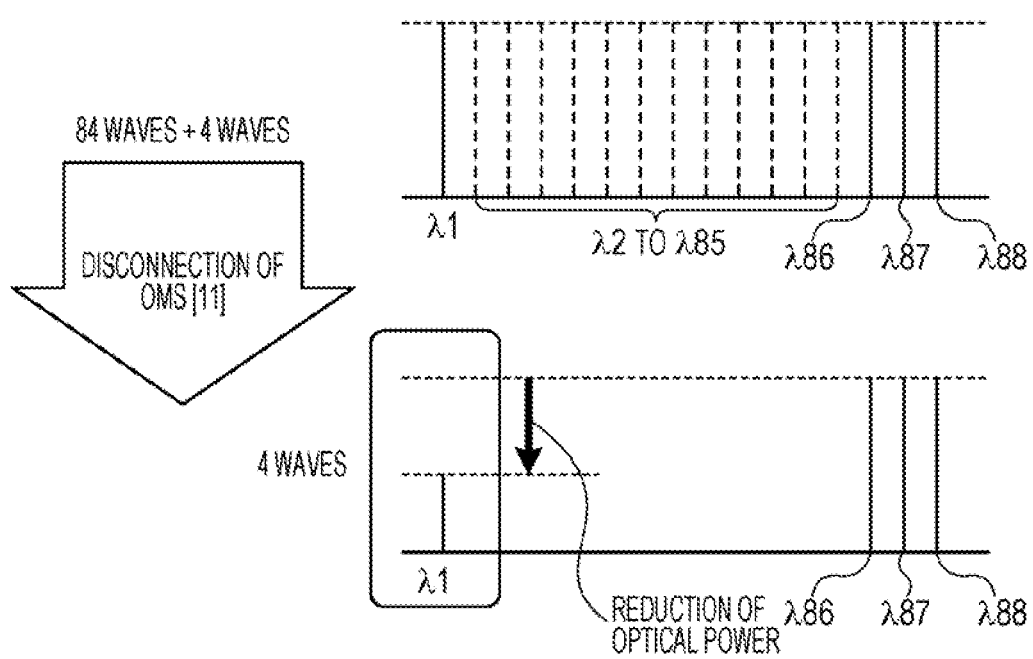
FIG. 1B is a view for explaining an example of a state of a change, in the optical power due to an OMS disconnection of multiplexed optical signals in an optical transmission system.

FIGS. 1A and 1B are views for explaining an example of a state of a change in the optical power due to an OMS disconnection of WDM multiplexed optical signals in an optical transmission system. As illustrated in FIG. 1A, each node in an optical transmission system for transmitting WDM signals is a reconfigurable optical add drop multiplexer (ROADM) node including an erbium doped fiber amplifier (EDFA). A communication path that includes ROADM nodes between the starting point and the end point and a transmission line of optical fiber that connects the ROADM nodes, is referred to as an optical path in the optical transmission system. Moreover, the interval between adjacent ROADM nodes connected by the transmission line is referred to as an OMS as illustrated in FIG. 1A.

In FIG. 1A, paths [2]-[85], which are optical paths, share OMS's [11] and [1]-[5] and ROADM nodes [C]-[H] between the ROADM node [A] and the ROADM node [H] via the OMS's [11] and [1]-[5] and the ROADM nodes [C]-[G]. The wavelengths of the paths [2]-[85] are λ2-λ85 respectively.

In FIG. 1A, paths [1] and [86]-[88] share OMS's [12] and [1]-[5] between the ROADM nodes [B]-[H] via the OMS's [12] and [1]-[5] and the ROADM nodes [C]-[G], Paths [1] and [86]-[88] also share the ROADM nodes [C]-[H]. The wavelengths of the paths [1] and [86]-[88] are λ1, λ86, λ87 and λ88 respectively.

Paths [2]-[85] and paths [1] and [86]-[88] are multiplexed and demultiplexed at the ROADM node [C] and share the OMS's [1]-[5] and the ROADM nodes [C]-[H].

SHB is produced when the optical signals pass through the EDFA. Specifically, when the optical signals pass through the EDFA, there is a decrease in the gain of the wavelengths of the optical signals and the gain of the wavelengths in the proximity thereof in the optical transmission system. The SHB from the EDFA may be represented with the following equation (1) as an approximate simplification model.

$$S_{allocated\ total}(\lambda) = \frac{\sum_{k=allocated\ ch}[S_{ch(k)}(\lambda) \cdot W_{ch(k)}]}{\sum_{k=allocated\ ch}[W_{ch(k)}]} \quad (1)$$

$S_{allocated\ total}(\lambda)$: Shape of gain ripple based on SHB (wavelength characteristics)

$W_{ch(k)}$: Weight of weighted average

In formula (1), λ represents the wavelength, ch(k)(k=1-88) represents the optical signals of a single wavelength, $S_{allocated\ total}(\lambda)$ represents the gain ripple based on SHB, and $W_{ch(k)}$ represents the weight of the weighted average. That is, the gain ripple based on the SHB for multiple wavelengths is the weighted average of the gain ripple based on the SHB for a single wavelength according to formula (1).

The Gain offset that is change (shape difference) of the shape (gain wavelength characteristics) of the gain ripple following the changes in the wavelength allocation of the WDM signals may be represented with the following formula (2). Although discussed in greater detail below, a change in the wavelength allocation of the WDM signals refers to the fact that only the remaining light which is not halted remains due to the existence of the dropping light which is an optical signal that is halted due to a belowmentioned transmission line disconnection in the OMS, for example, among the stationary light which is all of the multiplexed optical signals.

$$\text{Gain offset} = S_{remain}(\lambda) - S_{remain,drop}(\lambda) \quad (2)$$

$S_{remain}(\lambda)$: Shape of gain ripple based on SHB from remaining light (wavelength characteristics)

$S_{remain,drop}(\lambda)$: Shape of gain ripple based on SHB from stationary light (both remaining light and dropping light) (wavelength characteristics)

In formula (2), $S_{remain}(\lambda)$ represents to the shape of the gain ripple of the remaining light, and $S_{remain,drop}(\lambda)$ represents the shape of the gain ripple of the stationary light (both remaining light and dropping light).

Changes in the gain of the EDFA caused by the changes in the wavelength allocation of the WDM signals are generated in each ROADM node. When the WDM signals are transmitted through a plurality of ROADM nodes, that is, when the optical path of the WDM signals is configured to include a plurality of OMS's, the fluctuations in the gain caused by the ROADM nodes are accumulated. As a result, the power of the optical signals remaining in the WDM signals that have passed through the plurality of ROADM nodes fluctuates greatly immediately after the wavelength allocation of the WDM signals is changed.

For example, as illustrated in FIG. 1B, when the OMS [11] indicated in FIG. 1A is disconnected, the optical signals of wavelengths λ2 to λ85 become dropping light and the optical signals of wavelengths λ1 and λ86 to λ88 become remaining light. As a result, the optical power of the optical signal of the wavelength λ1 decreases and may fall out of the optical power range that can be received by a receiver connected to the ROADM nodes on the receiving side.

Accordingly, it can be seen that the cause of the changes in the optical power when there are changes in the wavelength allocation is "the gain ripple based on the SHB from the stationary light (both the remaining light and the dropping light)" and "the gain ripple based on the SHB from the remaining light" as in formula (2). That is, formula (2) indicates that if the difference between the two shapes (wavelength characteristics) of the "gain ripple based on SHB from stationary light" and the "gain ripple based on SHB from remaining light" can be reduced, the change in the shape of the gain ripple before and after the change in the wavelength allocation can be reduced. By reducing the difference between the two shapes (wavelength characteristics), changes in the optical power can be suppressed.

Figure 2B:
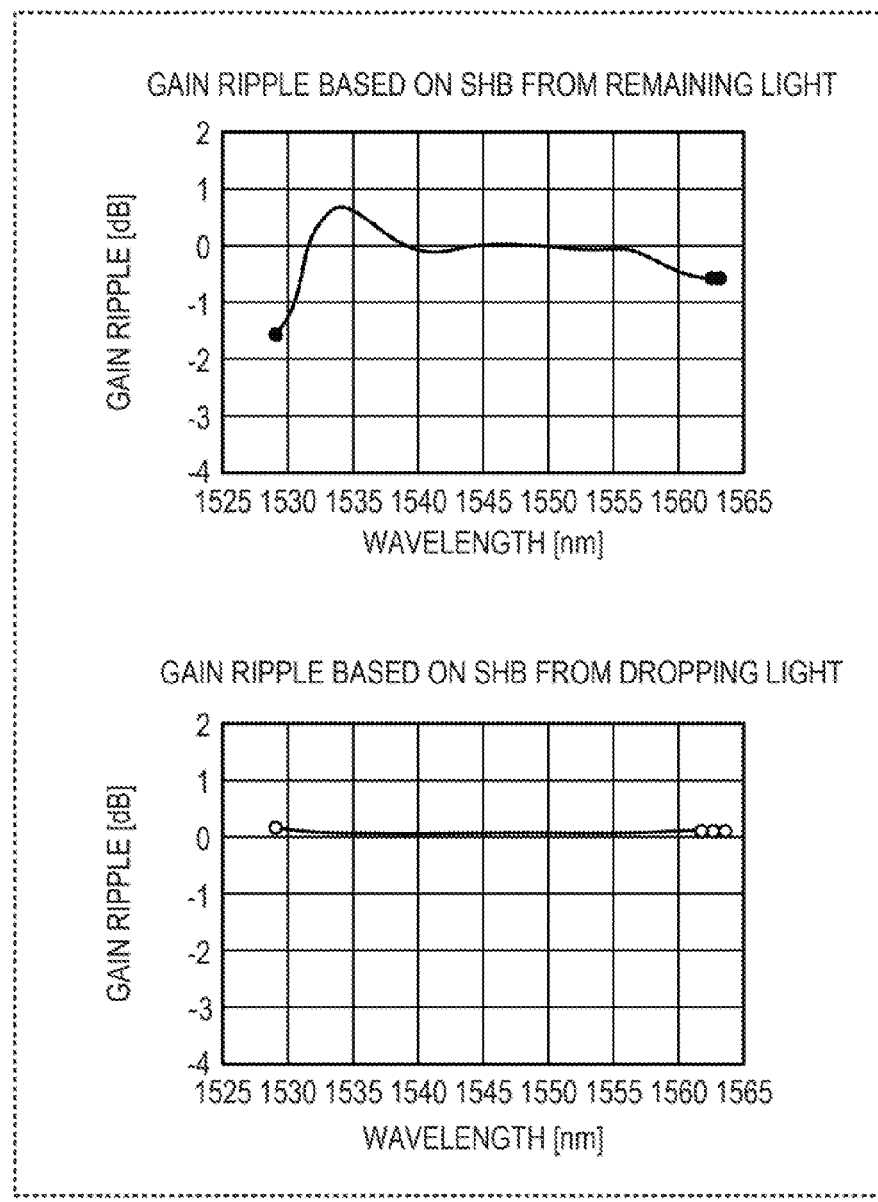
FIG. 2B is a view for explaining a state of wavelength allocation for limiting changes in a gain ripple shape following a change in the wavelength allocation in an optical transmission system.

FIGS. 2A and 2B are views for explaining a state of wavelength allocation for limiting changes in a gain ripple shape following a change in the wavelength allocation in an optical transmission system. The ROADM, nodes, the OMS's, and the optical paths in FIG. 2A are the same as those of FIG. 1A. For example, as illustrated in FIG. 2A, disconnection candidates in the optical transmission system include a disconnection candidate [1]=OMS [11] and a disconnection candidate [2]=OMS [12]. In the example of OMS [1], the paths [2] to [85] become dropping paths in the case of the disconnection of the disconnection candidate [1] and become remaining paths in the case of the disconnection of the disconnection candidate [2]. Moreover, in the example of OMS [1], the paths [1] and [86] to [88] become remaining paths in the case of the disconnection of the disconnection candidate [1] and become dropping paths in the case of the disconnection of the disconnection candidate [2].

In the case of the disconnection of the disconnection candidate [1] for example, when wavelengths are allocated at the OMS [1] to the paths [1] and [86] to [88] which are remaining paths, the shape of the gain ripple based on the SHB from remaining light takes on the shape indicated at the top in FIG. 2B. Similarly, in the case of the disconnection of the disconnection candidate [1] for example, when wavelengths are allocated at the OMS [1] to the paths [2] to [85] which are dropping paths, the shape of the gain ripple based on the SHB from dropping light takes on the shape indicated at the bottom in FIG. 2B.

In these cases, the wavelengths to be allocated to the paths [1] to [88] are suitably determined so that the shape difference between the shape of the gain ripple based on the SHB from the remaining light and the shape of the gain ripple based on the SHB from the dropping light is equal to or less than a predetermined amount. As a result, changes in the shape of the gain ripple can be reduced before and after changes in the wavelength allocation in the case of the disconnection of the disconnection candidate [1], and changes in the optical power can be suppressed.

The case of the disconnection of the disconnection candidate [2] is the same. In the case, of a plurality of disconnection candidates, the wavelengths to be allocated to the paths [1] to [88] are suitably determined so that the shape difference between the shape of the gain ripple based on the SHB from the remaining light and the shape of the gain ripple based on the SHB from the dropping light is equal to or less than a predetermined amount for all of the disconnection candidates.

When formula (2) is rewritten using formula (1), the formula becomes the following formula (3). That is, formula (3) represents the ability to reduce the change (shape difference) that is Gain offset of the shape (gain wavelength characteristics) of the gain ripple following the changes in the wavelength allocation of the WDM signals if the following two differences are reduced. These two differences include the shapes (wavelength characteristics) of "the gain ripple based on SHB from remaining light" and "the gain ripple based on SHB from dropping light." That is, by reducing the difference between the two shapes (wavelength characteristics), changes in the optical power can be suppressed before and after changes in the wavelength allocation.

$$\text{Gain offset} = S_{remain}(\lambda) - S_{remain,drop}(\lambda) \quad (3)$$

$$= \{S_{remain}(\lambda) - S_{drop}(\lambda)\} \cdot \frac{\sum_{k=dropping\ ch}[W_{ch(k)}]}{\sum_{k=remaining\ ch}[W_{ch(k)}] + \sum_{k=dropping\ ch}[W_{ch(k)}]}$$

Gain Offset: Shape (wavelength characteristics) of gain ripple based on SHB from remaining light $S_{drop}(\lambda)$: Shape (wavelength characteristics) of gain ripple based on SHB from dropping light When formula (2) is rewritten using formula (1), the formula becomes the following formula (4). That is, formula (4) represents the ability to reduce the change (shape difference) Gain offset of the shape (gain wavelength characteristics) of the gain ripple following the changes in the wavelength allocation of the WDM signals if the following two differences are reduced. These two differences include the differences in the shapes (wavelength characteristics) of "the gain ripple based on SHB from stationary light (both remaining light and dropping light)" and "the gain ripple based on SHB from dropping light." That is, by reducing the difference between the two shapes (wavelength characteristics), changes in the optical power can be suppressed before and after changes in the wavelength allocation.

$$\text{Gain offset} = S_{remain}(\lambda) - S_{remain,drop}(\lambda) \quad (4)$$

$$= \{S_{remain,drop}(\lambda) - S_{drop}(\lambda)\} \cdot \frac{\sum_{k=dropping\ ch}[W_{ch(k)}]}{\sum_{k=remaining\ ch}[W_{ch(k)}]}$$

$S_{remain,drop}(\lambda)$: Shape of gain ripple based on SHB from stationary light (both remaining light and dropping light) (wavelength characteristics)

$S_{drop}(\lambda)$: Shape (wavelength characteristics) of gain ripple based on SHB from dropping light When two of the three shapes among "the gain ripple based on SHB from stationary light (both remaining light and dropping light)", "the gain ripple based on SHB from remaining light" and "the gain ripple based on SHB from dropping light" are the same shape, the remaining one shape also becomes the same. That is, the shapes of the three ripple gains become the same.

Embodiment

[Basic Configuration of Optical Transmission System]

Figure 3:
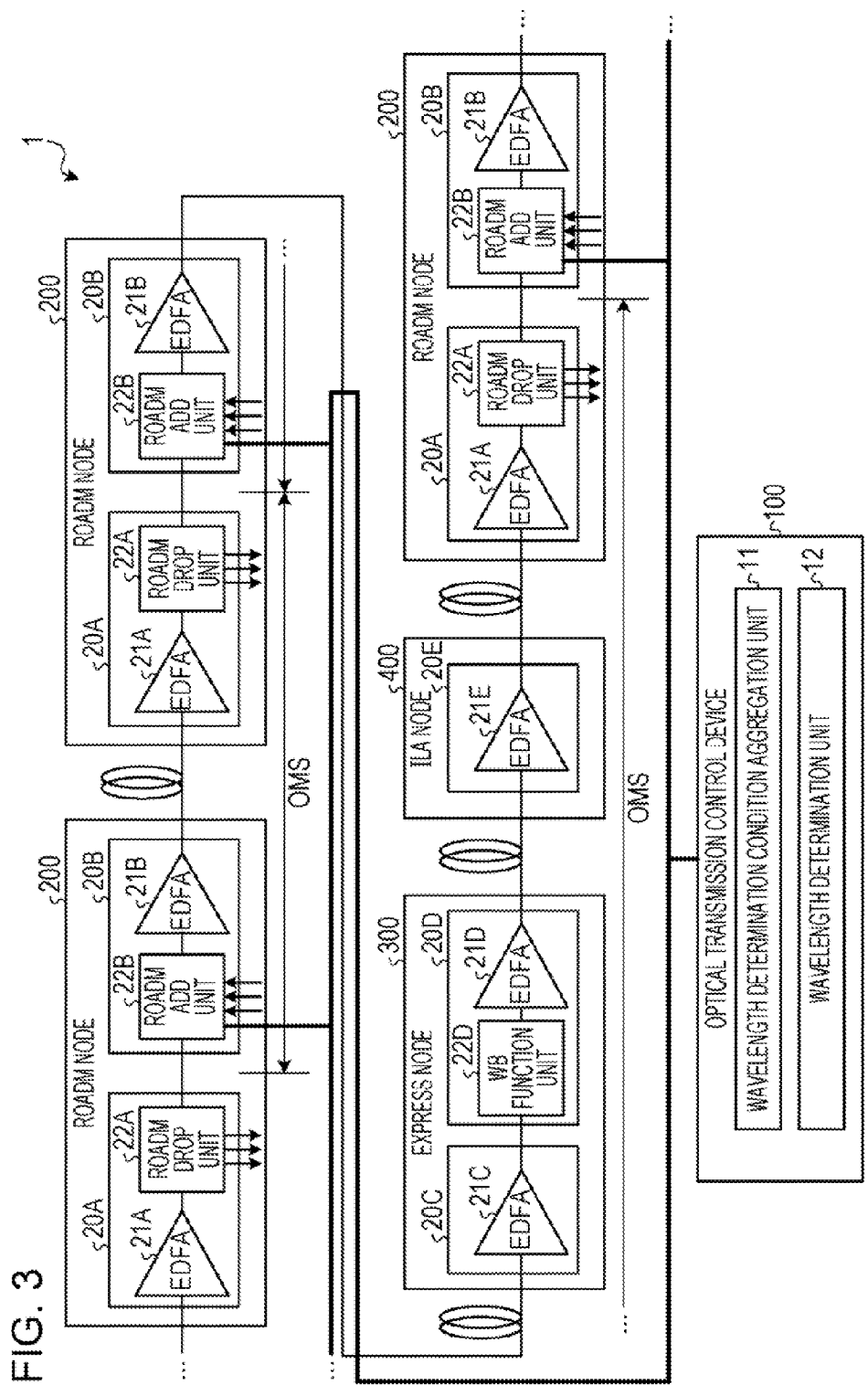
FIG. 3 is a block diagram of an example of a basic configuration of an optical transmission system according to an embodiment.

FIG. 3 is a block diagram of an example of a basic configuration of an optical transmission system according to an embodiment. As illustrated in FIG. 3, the optical transmission system 1 according to the embodiment has an optical transmission control device 100, a ROADM node 200, an express node 300, and an optical in-line amplifier equipment (ILA) node 300. FIG. 3 illustrates an example in which a plurality of ROADM nodes 200 are adjacent and connected to each other, and the express node 300 and the ILA node 400 are disposed between adjacent ROADM nodes 200. The optical transmission system 1 is formed with the plurality of ROADM nodes 200 disposed as a mesh or a ring and the like to form the basic configuration of the connections depicted in FIG. 3.

A communication path that includes the ROADM nodes 200 between the starting point and the end point and a transmission line of optical fiber that connects the ROADM nodes, is referred to as an optical path in the optical transmission system 1. As illustrated in FIG. 3, the section between an optical signal branching section 20A of one ROADM node 200 and an optical signal insertion section 20B of another ROADM node 200 that is adjacent to the one ROADM node 200 with the transmission line interposed therein, is referred to as the OMS. The OMS may include the express node 300 or the ILA node 400. Moreover, the OMS includes at least one EDFA inside the section. Optical paths having different combinations of the ROADM nodes 200 with starting points and end points share the OMS's in the optical transmission system 1.

One or more OMS's are connected as a mesh, for example, and one OMS connection path that links the starting point and the end point of the optical path becomes a route of the optical path in the optical transmission system 1. Generally, with regard to each of multiple optical paths that have various starting points and end points, the routes and wavelengths thereof are allocated, and consequently various wavelength allocation states can be found in each OMS. The wavelength allocation of the OMS refers to the allocation of the routes and wavelengths of the optical path.

When a disconnection occurs in the transmission line in a certain OMS, the optical path that passes through the disconnected OMS becomes dropping light before the OMS and the wavelength allocation changes in the OMS's downstream from the optical path. That is, the OMS disconnection, the halting of the optical path, and the changes in the wavelength allocations of the downstream OMS's occur in this order. Furthermore, the disconnection location of the transmission line is not limited to only one location, and it is possible that, for example, both the uplink and the downlink of an uplink/downlink fiber pair may be disconnected at the same time. There are a plurality of optical paths that pass through the location of the disconnection for one fiber disconnection, and there are multiple OMS's in which the wavelength allocation is changed on the downstream side of the optical paths, and various wavelength allocations of the dropping light in each OMS.

The optical transmission control device 100 has a wavelength determination condition aggregation unit 11 and a wavelength determination unit 12. During the allocation of wavelengths to the optical paths that have not yet been allocated wavelengths, the wavelength determination condition aggregation unit 11 aggregates and makes a list of information pertaining to the OMS's included in the optical transmission system 1, OMS disconnection candidates, optical paths for which the wavelength allocation has been completed, and optical paths to be allocated wavelengths. The optical paths for which the wavelength allocation has been completed are optical paths in which the terminal points (starting point and end point) of the optical path are defined, the operation time period (add time and erase time of optical path) of the optical path is defined, the OMS connection path linking the terminal points has been allocated, and the wavelength has been allocated. Moreover, an optical path to be allocated the wavelength is an optical path in which the terminal points of the optical path are defined, the operation time period of the optical path has been defined, the OMS connection path linking the terminal points has been allocated, but the wavelength has not been allocated yet.

The wavelength determination unit 12 determines the wavelengths of the unallocated optical paths so that the difference in the two gain ripple shapes is reduced for each OMS, each disconnection candidate, and each operation time period listed by the wavelength determination condition aggregation unit 11. The "two gain ripples" in this case refer to any two of the following three cases. Namely, any two among "the gain ripple based on SHB from stationary light (both remaining light and dropping light)", "the gain ripple based on SHB from remaining light" and "the gain ripple based on SHB from dropping light".

The wavelength determination condition aggregation unit 11 aggregates and makes a list of information about the OMS's included in the optical transmission system 1, OMS disconnection candidates, and the optical paths for which the wavelength allocation has been completed when the wavelengths to be allocated to optical paths in which the wavelengths have been allocated are changed.

The wavelength determination unit 12 then erases the optical paths for which the wavelengths have been allocated in order to change the wavelengths, and defines new optical paths. By erasing and redefining the optical paths, the route changes of the optical paths can be carried out at the same time as the wavelength changes. The wavelength determination unit 12 determines the wavelengths to be allocated to the newly defined optical paths so that the difference in the shapes of the two gain ripples can be reduced in the same way as discussed above, for each OMS, each disconnection candidate, and each operation time period.

While a method for estimating when quantifying the gain ripple based on SHB includes the method for calculating using the abovementioned formula (1), other methods may be used. The selection of a wavelength for each optical path to reduce the shape difference of the calculated ripple gain may use a combination optimization method or a search, of all the combinations may be carried out. Furthermore a method may be used that reduces the shape difference of the two gain ripples as a result without quantifying the gain ripples based on SHB.

The wavelength determination condition aggregation unit 11 is an example of an aggregation unit that aggregates the information of candidates for which there is a possibility that communication is cutoff among the wavelength-multiplexed transmission sections. Moreover, the wavelength determination unit 12 is an example of a classifying unit that, from the aggregated candidate information, classifies the optical paths that are set between optical transmission devices and that pass through the same wavelength-multiplexed transmission section. The classifying unit classifies the optical paths into a first optical path that is halted when the communication in a wavelength-multiplexed transmission section that corresponds to a candidate is cut off, and a second optical path that is not halted even if the communication in a wavelength-multiplexed transmission section that corresponds to a candidate is cut off. The wavelength determination unit 12 is also an example of a wavelength determination unit that determines each wavelength for a first wavelength group of the first optical path and for a second wavelength group of the second optical path so that the difference in the amplified gain wavelength characteristics of the classified first optical path and the second optical path becomes a predetermined amount or less.

Moreover, the operation time periods of the optical paths discussed above may be omitted. When the operation time periods for each optical path are defined, the wavelength allocation of the OMS is also dependent on the time and the operation time periods are treated in the same way for the OMS and the disconnection candidates.

The ROADM node 200 has a function for branching and inserting optical signals in each node. For example, the ROADM node 200 has: the optical signal branching section 20A which includes an EDFA 21A and a ROADM drop unit 22A having an optical signal branching function; and the optical signal insertion section 20B which includes a ROADM add unit 22B having an optical signal insertion function, and an EDFA 21B.

The express node 300 has functions for optical signal amplification, wavelength blocking, and power adjustment. For example, the express node 300 has: an amplifying unit 20C which includes an EDFA 21C; and a power adjusting unit 20D which includes an EDFA 21D and a wavelength blacker (WB) function unit 22D having functions for wavelength blocking and power adjustment.

The ILA node 400 has functions for amplifying and relaying optical signals. For example, the ILA node 400 has an amplifying unit 20E which includes an EDFA 21E.

[Dropping Path and Remaining Path]

Figure 4A:
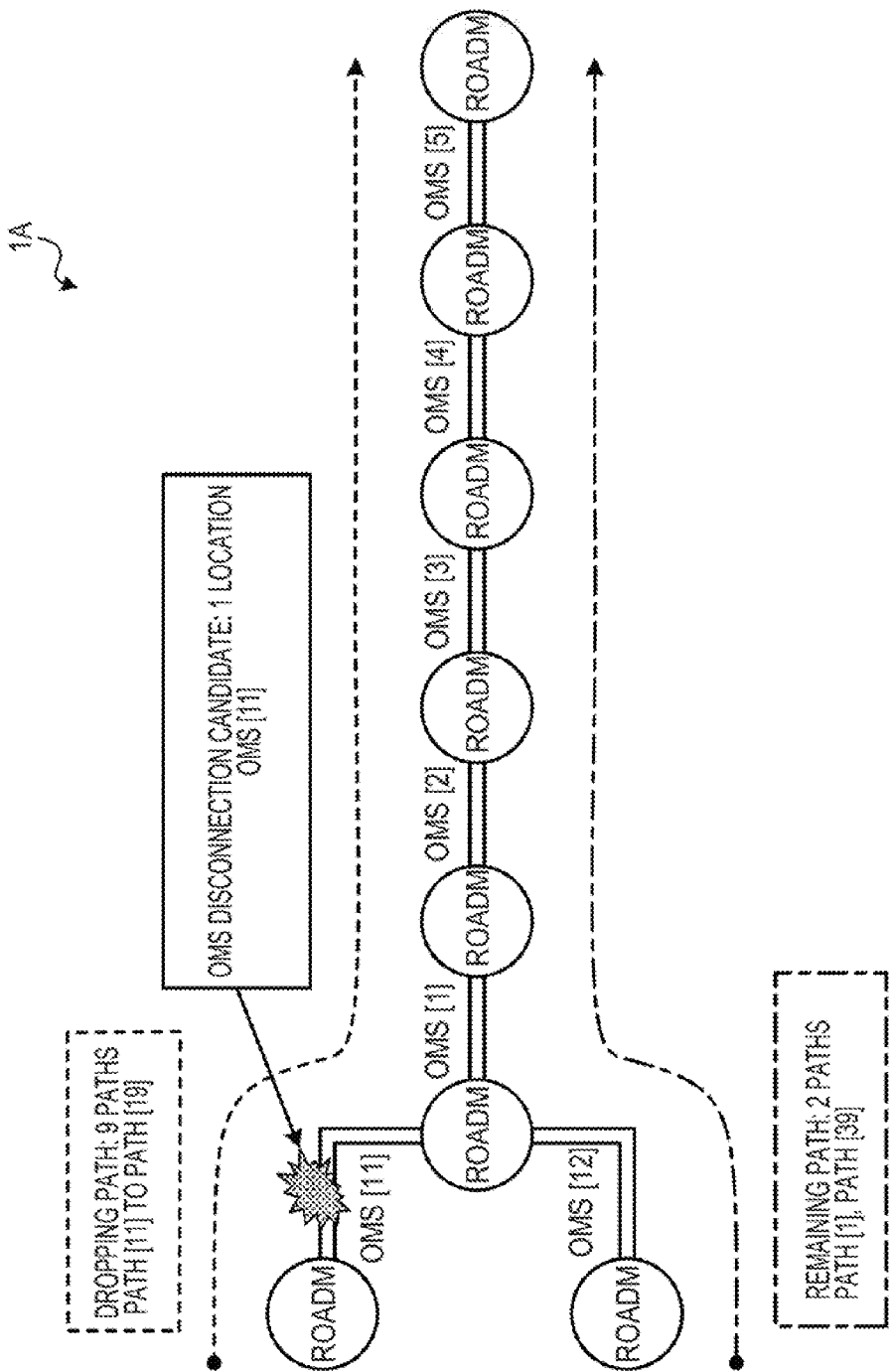
FIG. 4A is a view for explaining a dropping path and a remaining path when an OMS disconnection occurs in the optical transmission system according to the embodiment.

FIGS. 4A and 4B are views for explaining a dropping path and a remaining path when an OMS disconnection occurs in the optical transmission system according to the embodiment. For example, there is one OMS disconnection candidate at OMS [11] in an optical transmission system 1A depicted in FIG. 4A. When the disconnection at OMS [11] occurs, there are nine (path [11]-path [19]) dropping paths and two (path [1], path [39]) remaining paths.

Changes in the wavelength allocation occur at OMS [1] to OMS [5]. The wavelength allocations at OMS [1] to OMS [5] result in two remaining path wavelength allocations among the dropping light comprising the wavelengths of the nine dropping paths, path [11] to path [19], and the remaining light comprising the wavelengths of the two remaining paths, path [1] and path [39].

Moreover, a mesh-like optical transmission system, for example, is assumed in an optical transmission system 18 depicted in FIG. 4B. There are eight OMS disconnection candidates including OMS [1], [12], [13], [23], [24], [34], [41] and [42] in the optical transmission system 1B. There are 39 optical paths in total and the optical paths are classified into four routes of routes A to D. Furthermore, there are 12 combinations of changes in the OMS wavelength allocations. The optical paths are assumed as being added and not being erased according to the time order of the number "n" in the path [n].

If the embodiment is not applied to the optical transmission system 1B depicted in FIG. 4B, changes in the wavelength allocations occur for the OMS's [1] to [5] when a disconnection of the OMS [23] occurs when the wavelengths are allocated according to the wavelength order in response to the adding order (number order of the optical paths) of the optical paths. Therefore, the change in the optical power in the path [1] is large in the same way as in the related art (see belowmentioned FIG. 6D, FIG. 14D).

Accordingly, when the embodiment is applied to the optical transmission system 1B depicted in FIG. 4B, attention is paid to the remaining light and the dropping light, and the gain ripple based on the SHB from the wavelength allocation of the remaining light or the dropping light is estimated by calculating the gain ripple based on the wavelength allocation so that all the gain ripples become flat. A combination optimization method is used to select the wavelengths of each of the optical paths so as to achieve flatness. Furthermore, the wavelength of the optical paths are selected so that a flat gain ripple is achieved at the respective points in time of the optical path adding operations.

That is, the wavelengths of unallocated optical paths are determined based on the OMS list, the OMS disconnection candidate list, the list of optical paths for which the wavelengths have been allocated, and the list of optical paths for which wavelengths to be allocated using unallocated wavelengths are desirably determined, in an optical transmission system in which the OMS connections are configured as a mesh. The determination of the wavelengths for unallocated optical paths is carried out so that the difference in the shapes of any two gain ripples among the three gain ripples is reduced for each OMS, each disconnection candidate, and each operation time period (add time and erase time of an optical path). The three gain ripples include "the gain ripple based on SHB from stationary light (both remaining light and dropping light)", "The gain ripple based on SHB from remaining light" and "the gain ripple based on SHB from dropping light".

As a result, when the transmission line fiber disconnection occurs at OMS [23], the gain ripple based on SHB in OMS's [1] to [5] and the changes in the optical power of the remaining path are depicted in belowmentioned FIG. 14A to FIG. 14D. Other combinations of changes in the wavelength allocations of other OMS's are the same, In comparison to the optical transmission system 1A depicted in FIG. 4A, the optical transmission system 16 depicted in FIG. 4B involves more complex optical transmission system conditions. However, the gain ripple is flat and the changes in the optical power of the remaining path can be reduced in the same way as in the optical transmission system 1A. Specifically, the embodiment has a large effect even on the mesh-like optical transmission system, and this effect is not lost even when the complexity of the mesh increases.

[Optical Wavelength Determination Processing (Path New Addition)]

Figure 5A:
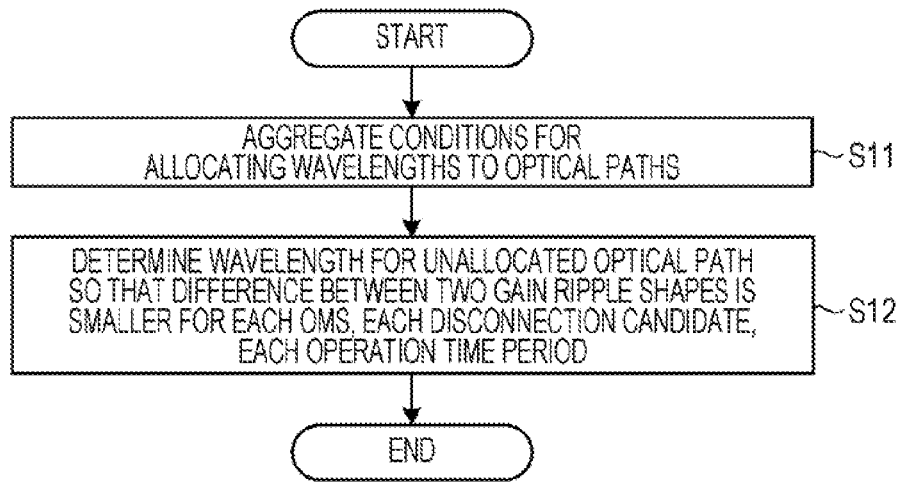
FIG. 5A is a flow chart depicting an example of wavelength determination processing (new path addition) carried out by an optical transmission control device in the optical transmission system according to the embodiment.

FIG. 5A is a flow chart depicting an example of wavelength determination processing (new path addition) carried out by the optical transmission control device in the optical transmission system according to the embodiment. The wavelength determination condition aggregation unit 11 in the optical transmission control device 100 aggregates and makes a list of conditions for allocating wavelengths to optical paths (operation S11). The conditions aggregated by the wavelength determination condition aggregation unit 11 include information pertaining to the OMS's of the optical transmission system 1, the OMS's of the disconnection candidates, the optical paths that have been allocated wavelengths, and the optical paths to be allocated wavelengths. The optical paths to be allocated wavelengths are optical paths in which the terminal points (starting point and end point) of the optical path are defined, the operation time period (add time and erase time of optical path) of the optical path is defined, the OMS connection path linking the starting point and the end point has been allocated, but the wavelength has not been allocated yet.

Next, the wavelength determination unit 12 of the optical transmission control device 100 determines the wavelength for an unallocated optical path so that the difference between any two gain ripple shapes among the three gain ripples is reduced for each OMS, each disconnection candidate, and each operation time period (operation S12). The three gain ripples include "the gain ripple based on SHB from stationary light (both remaining light and dropping light)", "the gain ripple based on SHB from remaining light" and "the gain ripple based on SHB from dropping light". The wavelength determination unit 12 then outputs the wavelengths of the optical paths for which the wavelengths have been allocated.

[Optical Wavelength Determination Processing (Path Wavelength Change)]

Figure 5B:
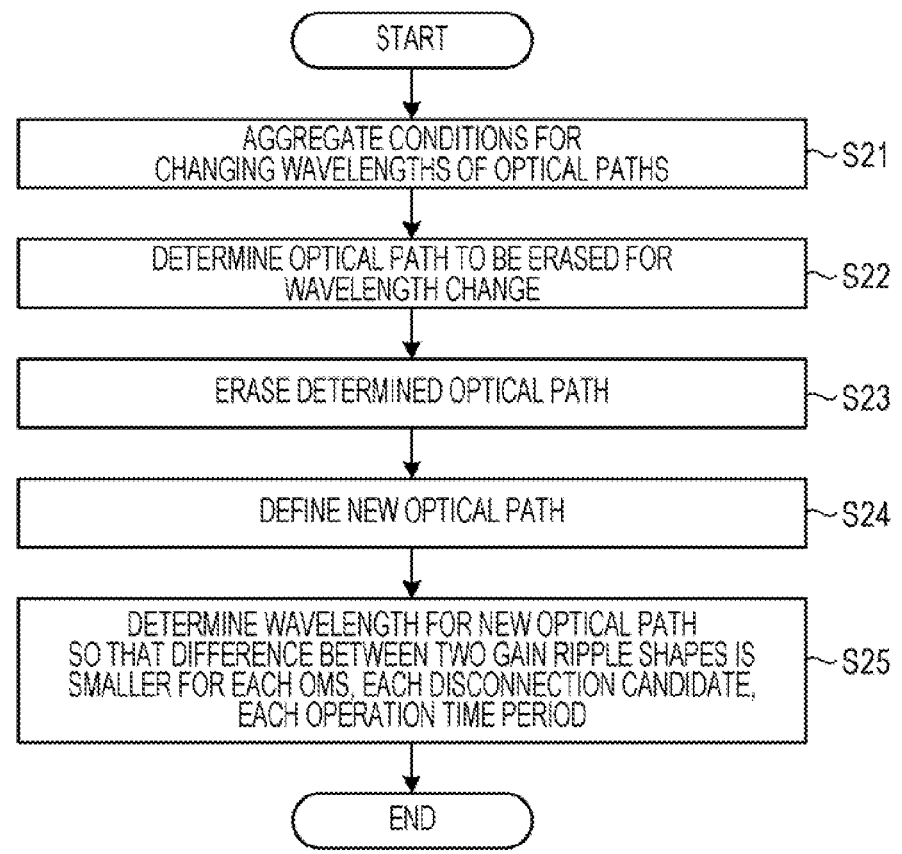
FIG. 5B is a flow chart depicting an example of wavelength determination processing (path wavelength change) carried out by an optical transmission control device in the optical transmission system according to the embodiment.

FIG. 5B is a flow chart depicting an example of wavelength determination processing (path wavelength change) carried out by the optical transmission control device in the optical transmission system according to the embodiment. The wavelength determination condition aggregation unit 11 in the optical transmission control device 100 aggregates and makes a list of conditions for changing the wavelengths of optical paths (operation S21). The conditions aggregated by the wavelength determination condition aggregation unit 11 include information pertaining to the OMS's of the optical transmission system 1, the OMS's of the disconnection candidates, and the optical paths in operation (wavelengths have been allocated). The optical paths in operation (wavelengths have been allocated) are optical paths in which the terminal points (starting point and end point) of the optical path are defined, the operation time period (add time and erase time of optical path) of the optical path is defined, the OMS connection path linking the starting point and the end point has been allocated, and the wavelength has been allocated, for each optical path.

Next, the wavelength determination unit 12 of the optical transmission control device 100 determines an optical path to be erased for changing the wavelengths (operation S22). An optical path to be erased is determined from among the optical paths in which the OMS connection path linking the starting point and the end point is allocated and the wavelength is allocated. Next, the wavelength determination unit 12 erases the optical path determined in operation S22 (operation S23).

Next, the wavelength determination unit 12 defines a new optical path to replace the optical path erased in operation S23 (operation S24). If no route changes are carried out from the optical path erased in operation S23, the wavelength determination unit 12 reuses the terminal points of the optical path before erasing and the OMS connection path that links the starting point and the end point. Conversely, if a route change is carried out from the optical path erased in operation S23, the wavelength determination unit 12 newly defines terminal points of the optical path and the OMS connection path that links the starting point and the end point.

Next, the wavelength determination unit 12 determines the wavelength of the new optical path so that the difference between any two gain ripple shapes among the three gain ripples is reduced for each OMS, each disconnection candidate, and each operation time period (operation S25). The three gain ripples include "the gain ripple based on SHB from stationary light (both remaining light and dropping light)", "the gain ripple based on SHB from remaining light" and "the gain ripple based on SHB from dropping light". The wavelength determination unit 12 then outputs, to each optical path to be restored after being erased, the wavelength allocated after the restoring.

Gain ripples based on SHB from stationary light, gain ripples based on SHB from remaining light, gain ripples based on SHB from dropping light, and the amount of change in the optical power of the remaining path are explained with reference to FIG. 6A to FIG. 14D for related art examples and for first to eighth wavelength allocation states of the embodiment. The configuration of the optical transmission system 1A depicted in FIG. 4A is assumed in FIG. 6A to FIG. 13D.

Figure 6A:
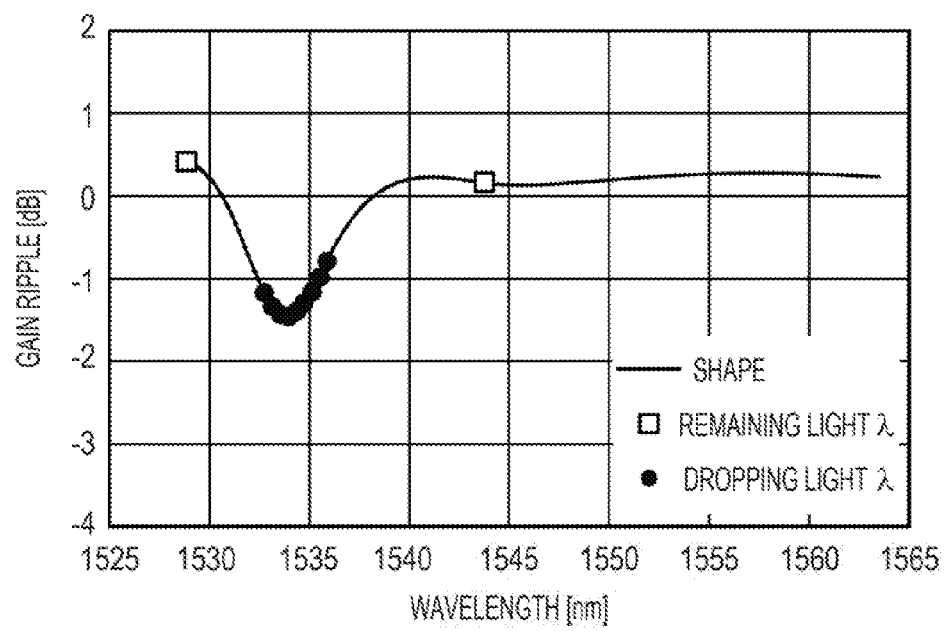
FIG. 6A is a view depicting an example of gain ripple based on the SHB from stationary light in an optical transmission system as in the related art.
Figure 6B:
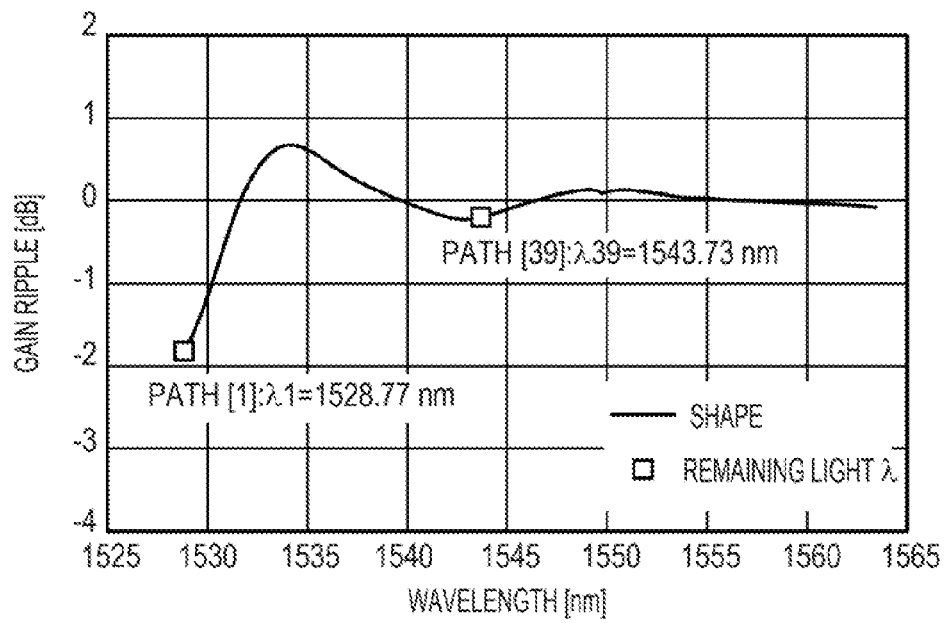
FIG. 6B is a view depicting an example of gain ripple based on the SHB from remaining light in an optical transmission system as in the related art.
Figure 6C:
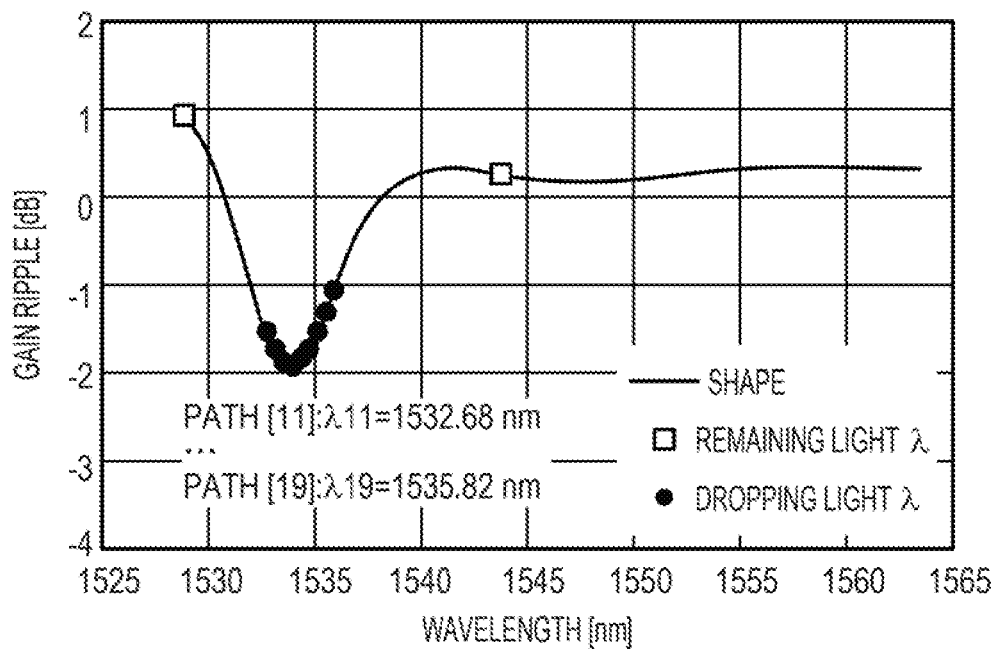
FIG. 6C is a view depicting an example of gain ripple based on the SHB from dropping light in an optical transmission system as in the related art.
Figure 6D:
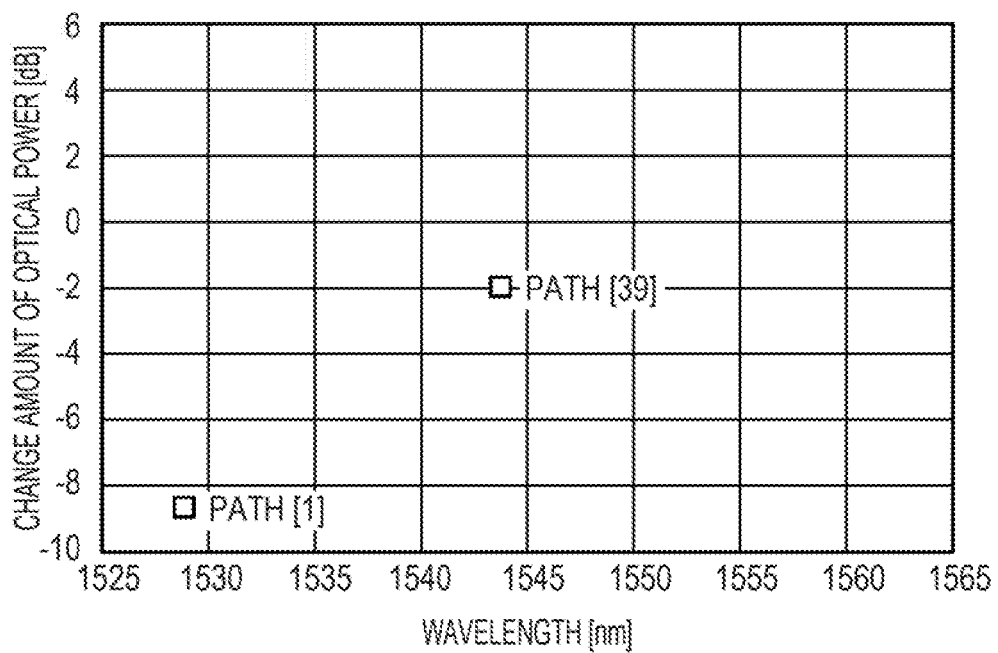
FIG. 6D is a view depicting an example of the amount of change of the optical power in a remaining path in an optical transmission system as in the related art.

FIG. 6A is a view depicting an example of gain ripple based on the SHB from stationary light in an optical transmission system as in the related art. FIG. 6B is a view depicting an example of gain ripple based on the SHB from remaining light in an optical transmission system as in the related art. FIG. 6C is a view depicting an example of gain ripple based on the SHB from dropping light in an optical transmission system as in the related art. FIG. 6D is a view depicting an example of the amount of change of the optical power in a remaining path in an optical transmission system as in the related art.

The numbers of the optical paths are allocated as-is in the wavelength order in the related art example for comparison with the embodiment. Hereinbelow, λx (where x is a natural number from 1 to 88) represents the wavelength number and a wavelength interval (50 GHz interval) of approximately 0.4 nm is applied in order from the shortest wavelength. For example, path [1]:λ1=1528.77 nm, path [11]:λ11=1532.68 nm, . . . , path [19]:λ19=1535.82 nm, path [39]:λ39=1543.73 nm. As can be seen in FIG. 6A to FIG. 6D, the difference in the shapes among the gain ripples is large and the amount of change in the optical power of the remaining path in path [1] is large.

[First Wavelength Allocation State]

In the first wavelength allocation state, the remaining light and the dropping light are placed consecutively in proximity to each other while in a steady state as a method for reducing the difference in the shapes of the gain ripples. For example, path [1]:λ10=1532.39 nm, path [11]:λ11=1532.68 nm, ..., path [19]:λ19=1535.82 nm and path [39]:λ20=1536.22 nm.

Figure 7A:
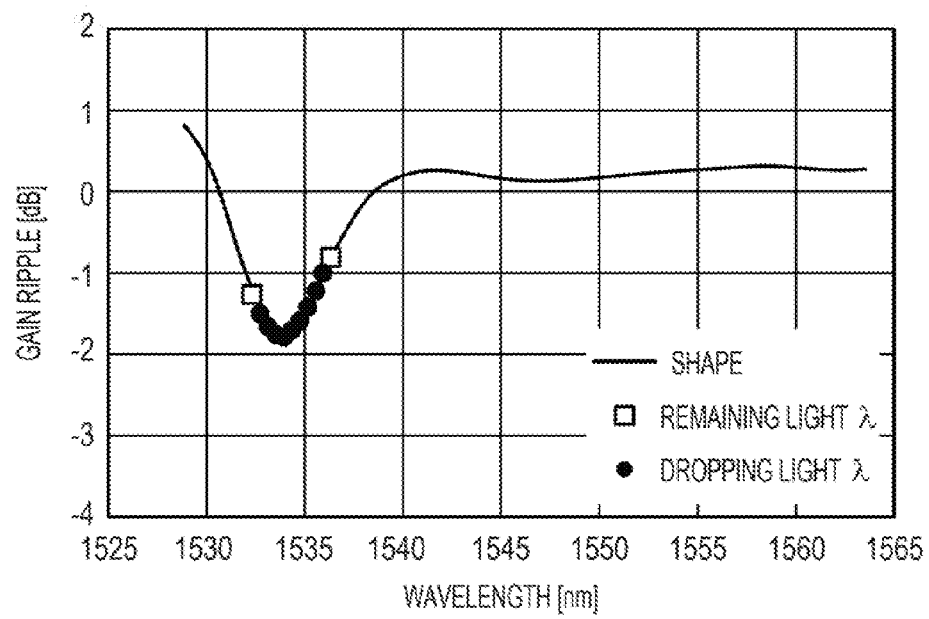
FIG. 7A is a view depicting an example of gain ripple based on the SHB from stationary light in a first wavelength allocation state in the optical transmission system according to the embodiment.
Figure 7B:
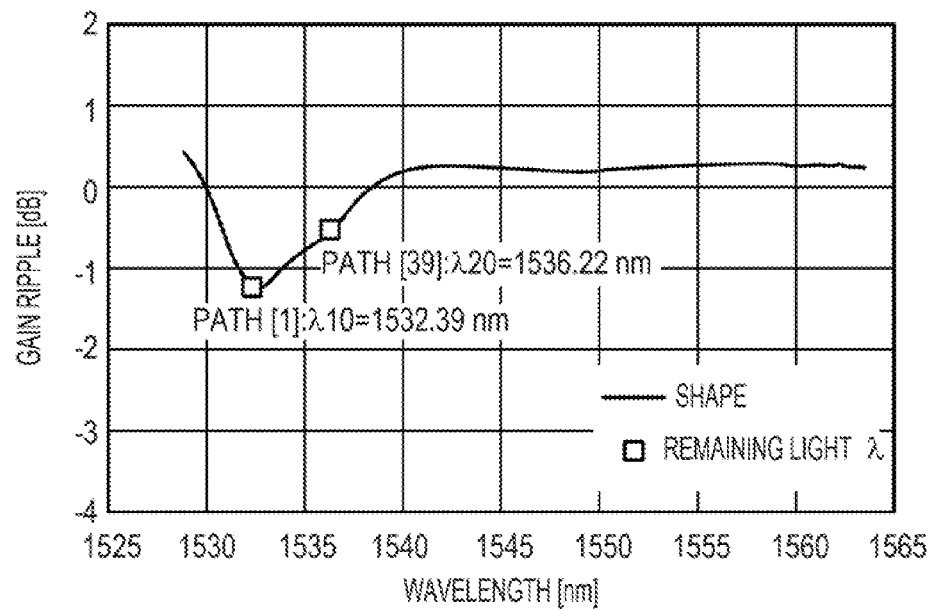
FIG. 7B is a view depicting an example of gain ripple based on the SHB from remaining light in the first wavelength allocation state in the optical transmission system according to the embodiment.
Figure 7C:
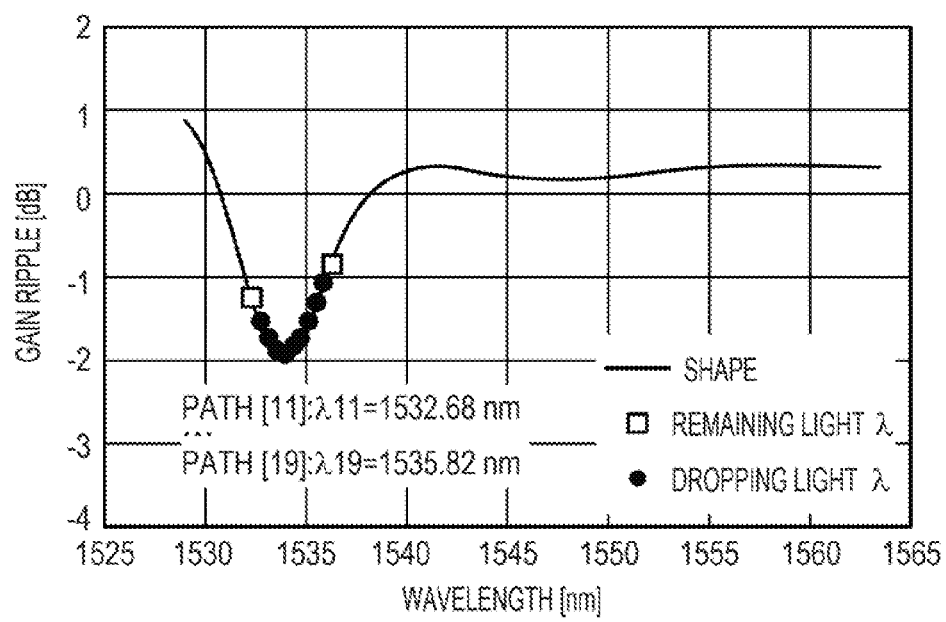
FIG. 7C is a view depicting an example of gain ripple based on the SHB from dropping light in the first wavelength allocation state in the optical transmission system according to the embodiment.
Figure 7D:
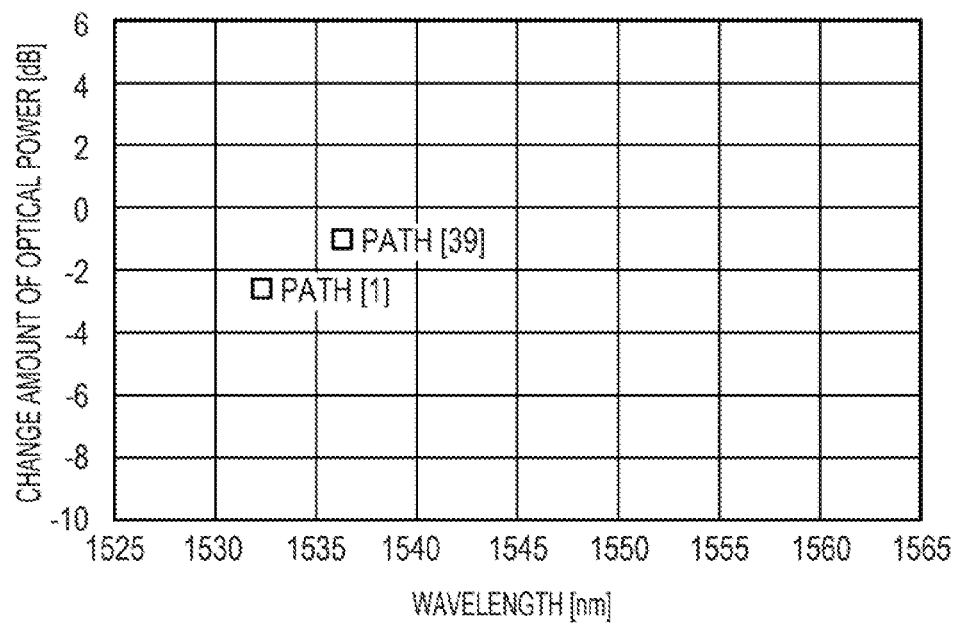
FIG. 7D is a view depicting an example of the amount of change of the optical power in a remaining path in the first wavelength allocation state in the optical transmission system according to the embodiment.

FIG. 7A is a view depicting an example of gain ripple based on the SHB from stationary light in the first wavelength allocation state in the optical transmission system according to the embodiment. FIG. 7B is a view depicting an example of gain ripple based on the SHB from remaining light in the first wavelength allocation state in the optical transmission system according to the embodiment. FIG. 7C is a view depicting an example of gain ripple based on the SHB from dropping light in the first wavelength allocation state in the optical transmission system according to the embodiment. FIG. 7D is a view depicting an example of the amount of change of the optical power in a remaining path in the first wavelength allocation state in the optical transmission system according to the embodiment. As can be seen in FIG. 7A to FIG. 7D, the wavelengths of the remaining paths are different, the difference in the shapes among the ripple gains is reduced, and the change in the optical power of the remaining path can be reduced in comparison to the related art example in FIG. 6A to FIG. 6D.

[Second Wavelength Allocation State]

In the second wavelength allocation state, the remaining light and the dropping light are placed with a wavelength interval of wavelength number one between each other while in a steady state as a method for reducing the difference in the gain ripple shapes. For example, path [1]: λ9=1531.90 nm, path [11]:λ11=1532.68 nm, ..., path [19]:λ19=1535.82 nm, path [39]:λ39=1536.61 nm.

Figure 8A:
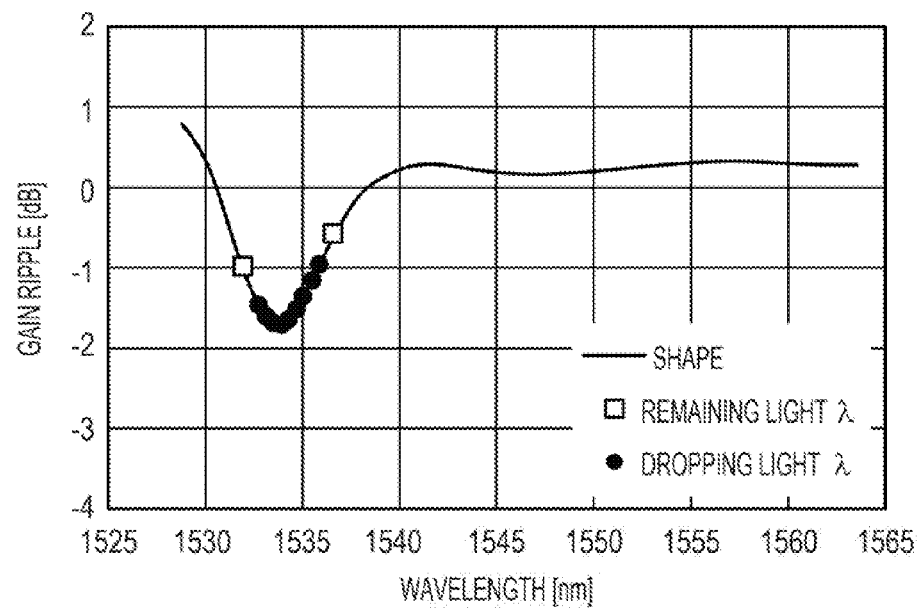
FIG. 8A is a view depicting an example of gain ripple based on the SHB from stationary light in a second wavelength allocation state in the optical transmission system according to the embodiment.
Figure 8B:
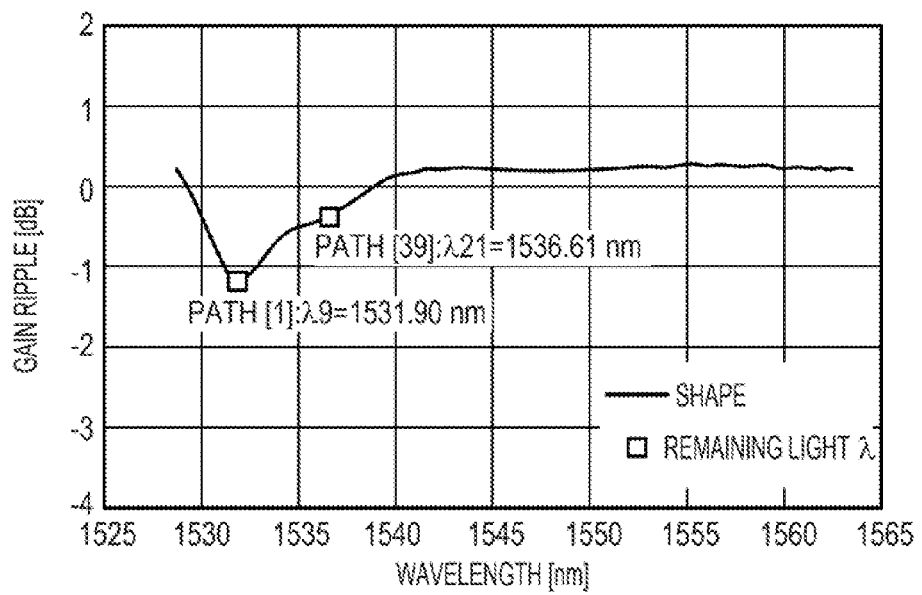
FIG. 8B is a view depicting an example of gain ripple based on the SHB from remaining light in the second wavelength allocation state in the optical transmission system according to the embodiment.
Figure 8C:
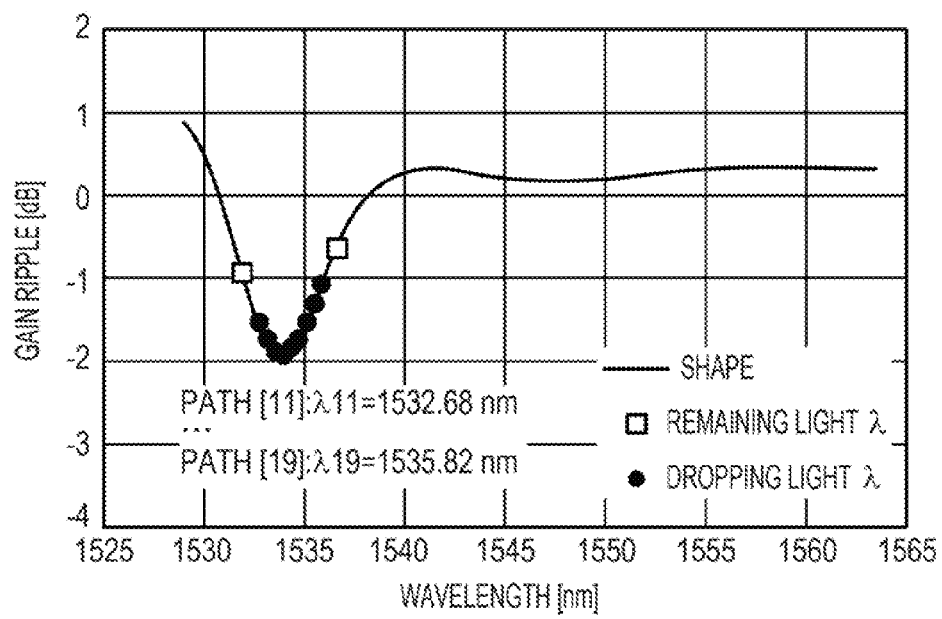
FIG. 8C is a view depicting an example of gain ripple based on the SHB from dropping light in the second wavelength allocation state in the optical transmission system according to the embodiment.
Figure 8D:
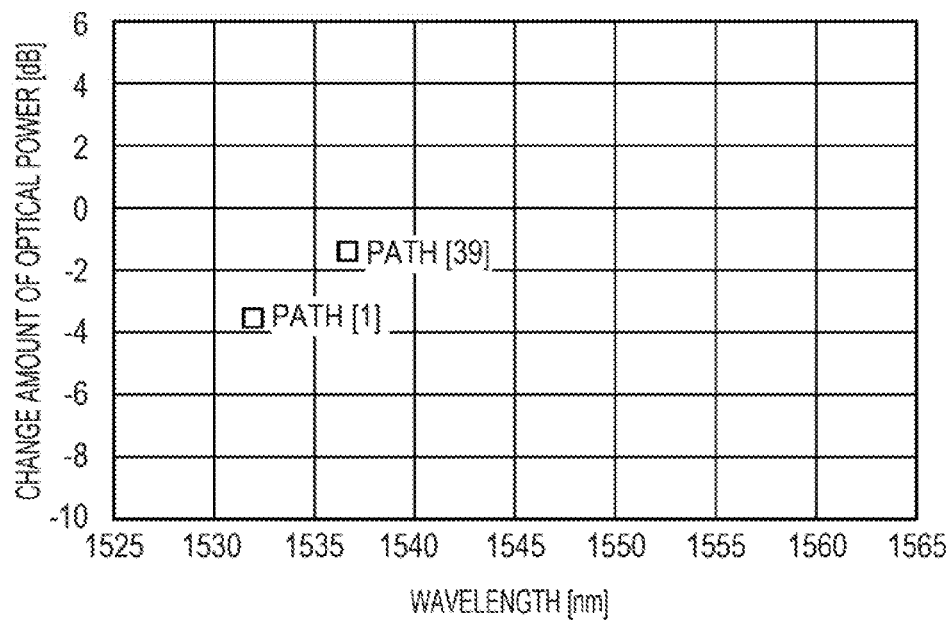
FIG. 8D is a view depicting an example of the amount of change of the optical power in a remaining path in the second wavelength allocation state in the optical transmission system according to the embodiment.

FIG. 8A is a view depicting an example of gain ripple based on the SHB from stationary light in the second wavelength allocation state in the optical transmission system according to the embodiment. FIG. 8B is a view depicting an example of gain ripple based on the SHB from remaining light in the second wavelength allocation state in the optical transmission system according to the embodiment. FIG. 8C is a view depicting an example of gain ripple based on the SHB from dropping light in the second wavelength allocation state in the optical transmission system according to the embodiment. FIG. 8D is a view depicting an example of the amount of change of the optical power in a remaining path in the second wavelength allocation state in the optical transmission system according to the embodiment. As can be seen in FIG. 8A to FIG. 8D, the wavelengths of the remaining paths are different, the difference in the shapes among the ripple gains is reduced, and the change in the optical power of the remaining path can be reduced in comparison to the related art example in FIG. 6A to FIG. 6D.

[Third Wavelength Allocation State]

In the third wavelength allocation state, the remaining light and the dropping light are placed consecutively as a plurality of proximal allocations of the remaining light and the dropping light as a method for reducing the difference in the shapes of the gain ripples. The allocation examples are as follows: path [1]:λ1=1528.77 nm, path [11]:λ2=1529.16 nm, ..., path [15]:λ6=1530.72 nm, path [16]:λ35=1542.14 nm, ..., path [19]:λ38=1543.33 nm, path [39]:λ39=1543.73 nm.

Figure 9A:
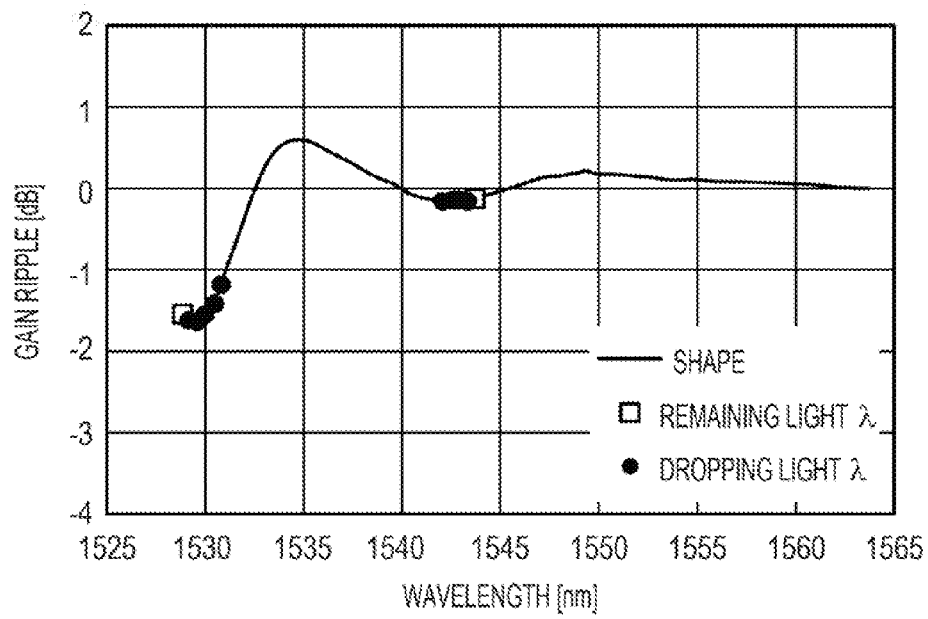
FIG. 9A is a view depicting an example of gain ripple based on the SHB from stationary light in a third wavelength allocation state in the optical transmission system according to the embodiment.
Figure 9B:
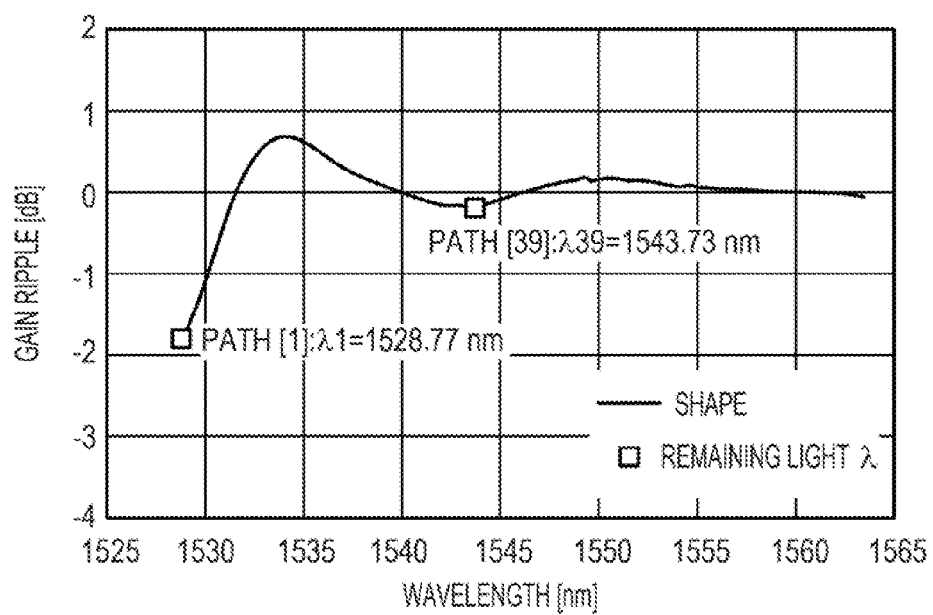
FIG. 9B is a view depicting an example of gain ripple based on the SHB from remaining light in the third wavelength allocation state in the optical transmission system according to the embodiment.
Figure 9C:
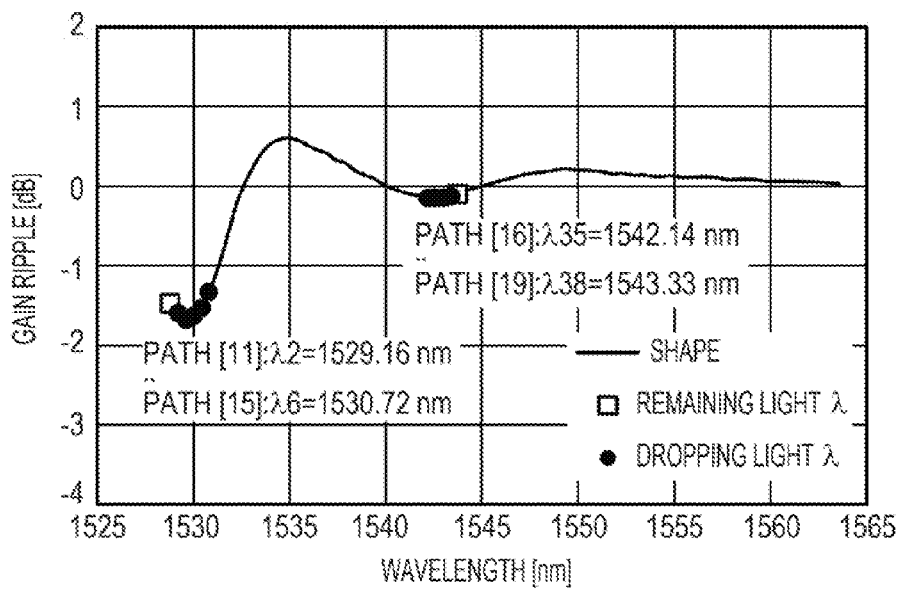
FIG. 9C is a view depicting an example of gain ripple based on the SHB from dropping light in the third wavelength allocation state in the optical transmission system according to the embodiment.
Figure 9D:
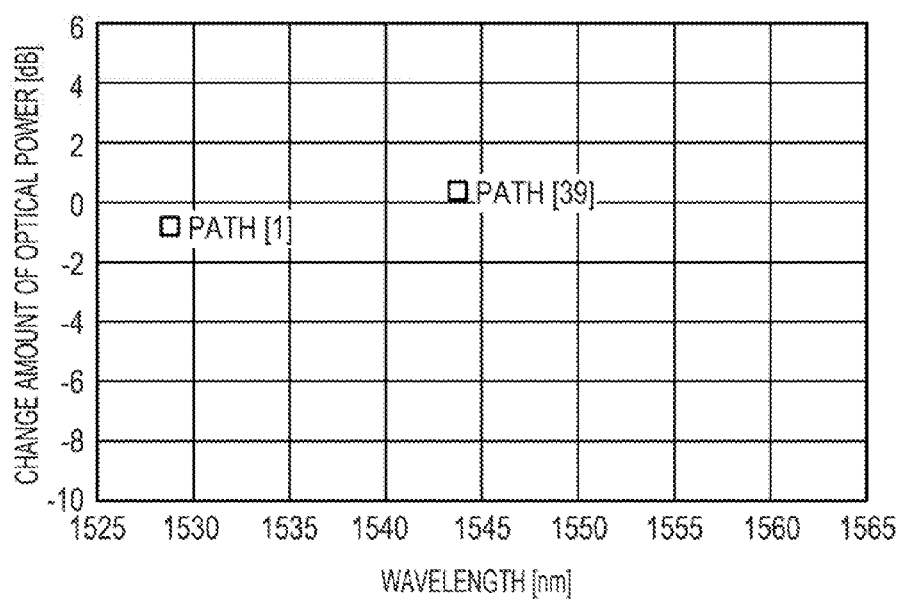
FIG. 9D is a view depicting an example of the amount of change of the optical power in a remaining path in the third wavelength allocation state in the optical transmission system according to the embodiment.

FIG. 9A is a view depicting an example of gain ripple based on the SHB from stationary light in the third wavelength allocation state in the optical transmission system according to the embodiment. FIG. 9B is a view depicting an example of gain ripple based on the SHB from remaining light in the third wavelength allocation state in the optical transmission system according to the embodiment. FIG. 9C is a view depicting an example of gain ripple based on the SHB from dropping light in the third wavelength allocation state in the optical transmission system according to the embodiment. FIG. 9D is a view depicting an example of the amount of change of the optical power in a remaining path in the third wavelength allocation state in the optical transmission system according to the embodiment. As can be seen in FIG. 9A to FIG. 9D, the wavelengths of the dropping paths are different, the difference in the shapes among the ripple gains is reduced, and the change in the optical power of the remaining path can be reduced in comparison to the related art example in FIG. 6A to FIG. 6D.

[Fourth Wavelength Allocation State]

In the fourth wavelength allocation state, the remaining light and the dropping light are placed with a wavelength interval of wavelength number one between each other as a plurality of proximal allocations of the remaining light and the dropping light as a method for reducing the difference in the shapes of the gain ripples. The allocation examples are as follows: path [1]:λ1=1528.77 nm, path [11]:λ3=1529.55 nm, ..., path [15]:λ7=1531.12 nm, path [16]:λ34=1541.75 nm, ..., path [19]:λ37=1542.94 nm, path [39]:λ39=1543.73 nm.

Figure 10A:
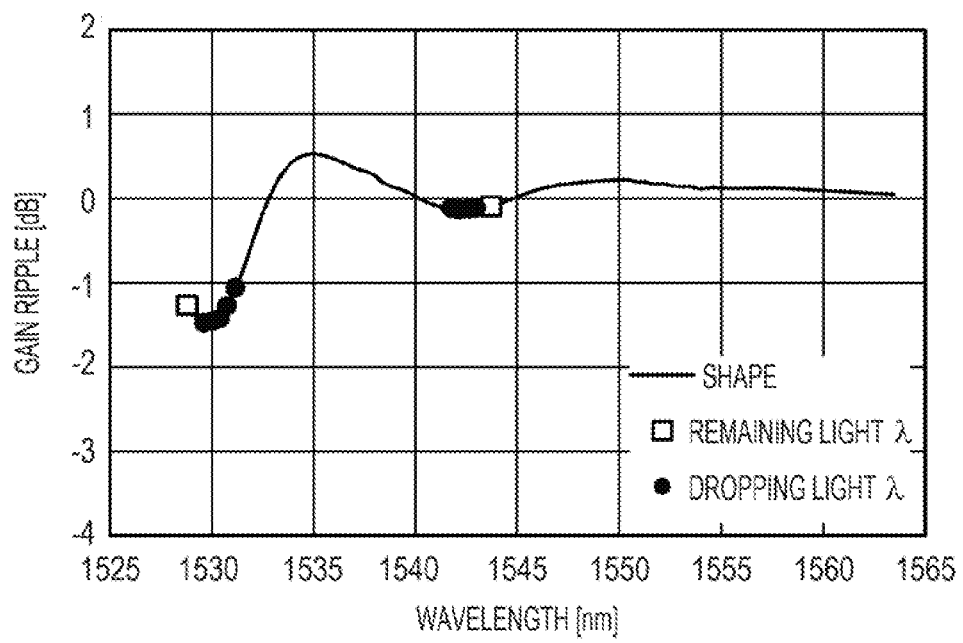
FIG. 10A is a view depicting an example of gain ripple based on the SHB from stationary light in a fourth wavelength allocation state in the optical transmission system according to the embodiment.
Figure 10B:
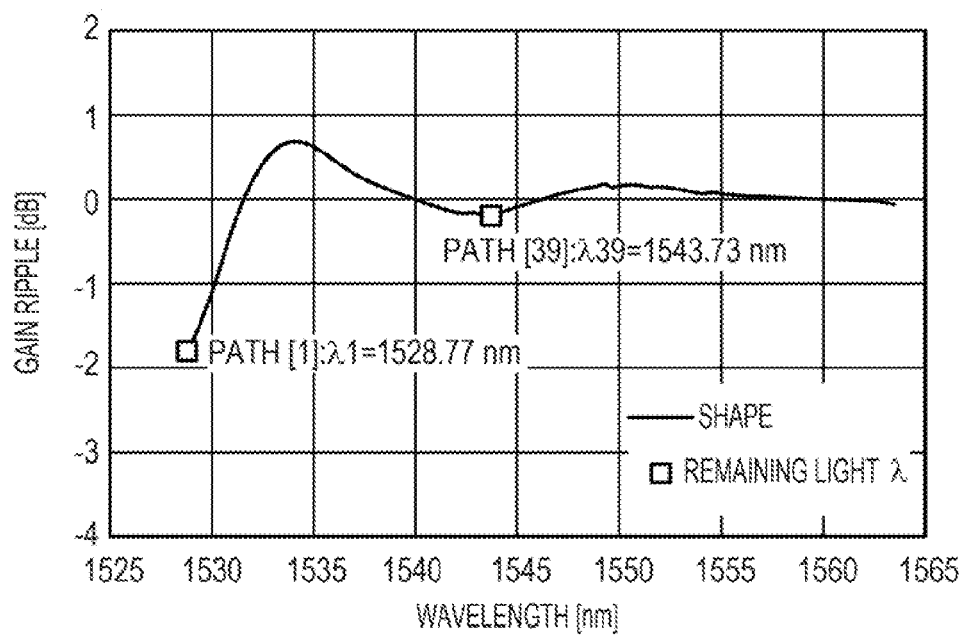
FIG. 10B is a view depicting an example of gain ripple based on the SHB from remaining light in the fourth wavelength allocation state in the optical transmission system according to the embodiment.
Figure 10C:
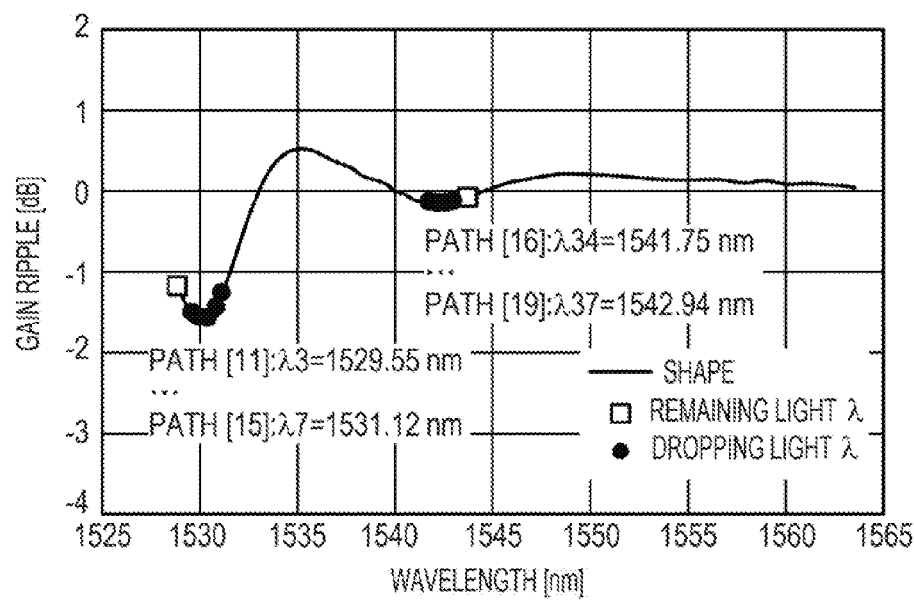
FIG. 10C is a view depicting an example of gain ripple based on the SHB from dropping light in the fourth wavelength allocation state in the optical transmission system according to the embodiment.
Figure 10D:
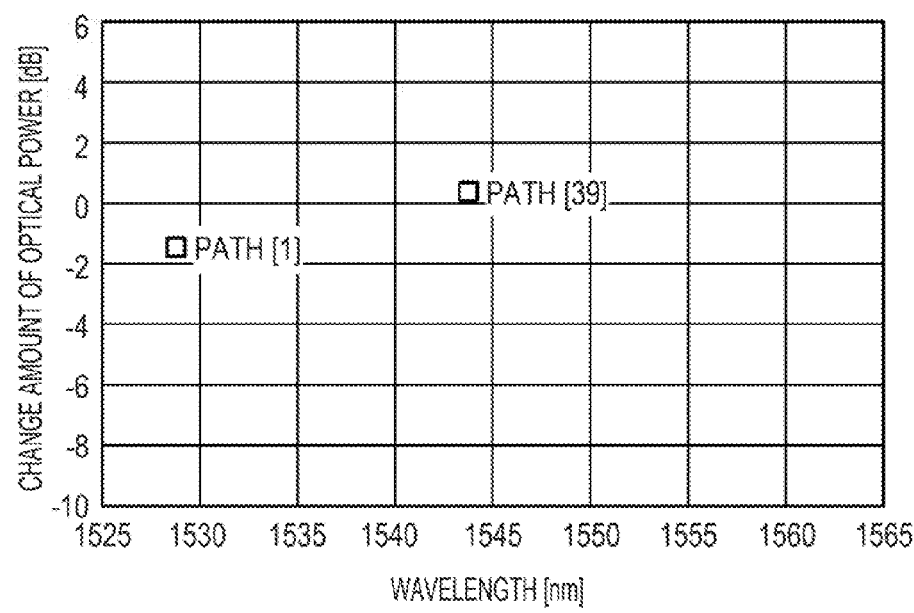
FIG. 10D is a view depicting an example of the amount of change of the optical power in a remaining path in the fourth wavelength allocation state in the optical transmission system according to the embodiment.

FIG. 10A is a view depicting an example of gain ripple based on the SHB from stationary light in the fourth wavelength allocation state in the optical transmission system according to the embodiment. FIG. 10B is a view depicting an example of gain ripple based on the SHB from remaining light in the fourth wavelength allocation state in the optical transmission system according to the embodiment. FIG. 10C is a view depicting an example of gain ripple based on the SHB from dropping light in the fourth wavelength allocation state in the optical transmission system according to the embodiment. FIG. 10D is a view depicting an example of the amount of change of the optical power in a remaining path in the fourth wavelength allocation state in the optical transmission system according to the embodiment. As can be seen in FIG. 10A to FIG. 10D, the wavelengths of the dropping paths are different, the difference in the shapes among the ripple gains is reduced, and the change in the optical power of the remaining path can be reduced in comparison to the related art example in FIG. 6A to FIG. 6D.

[Fifth Wavelength Allocation State]

Figure 11A:
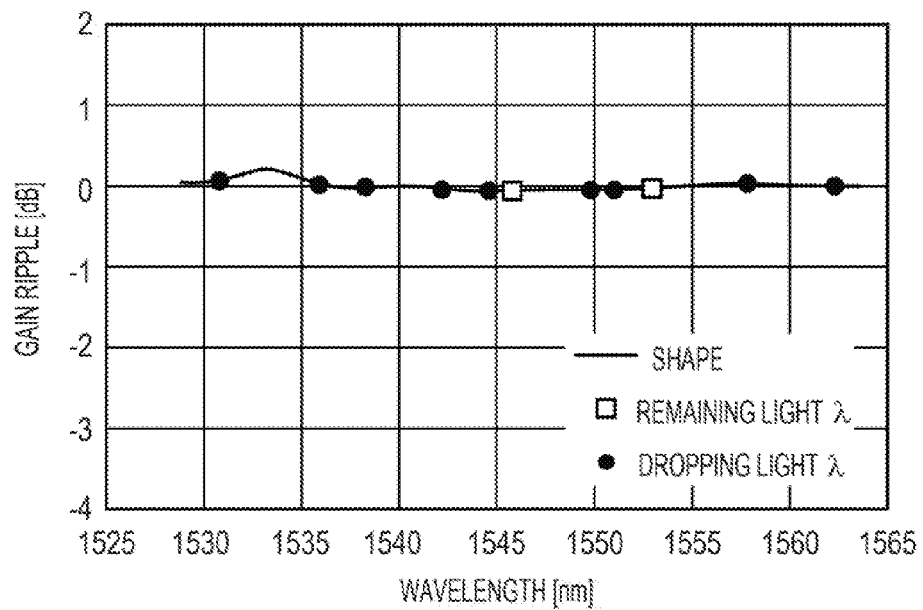
FIG. 11A is a view depicting an example of gain ripple based on the SHB from stationary light in a fifth wavelength allocation state in the optical transmission system according to the embodiment.
Figure 11B:
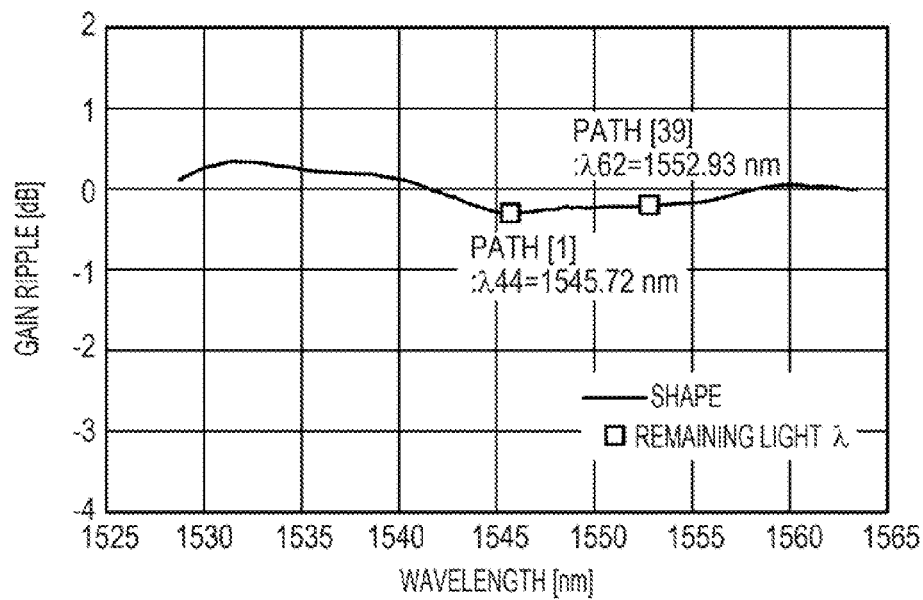
FIG. 11B is a view depicting an example of gain ripple based on the SHB from remaining light in the fifth wavelength allocation state in the optical transmission system according to the embodiment.
Figure 11C:
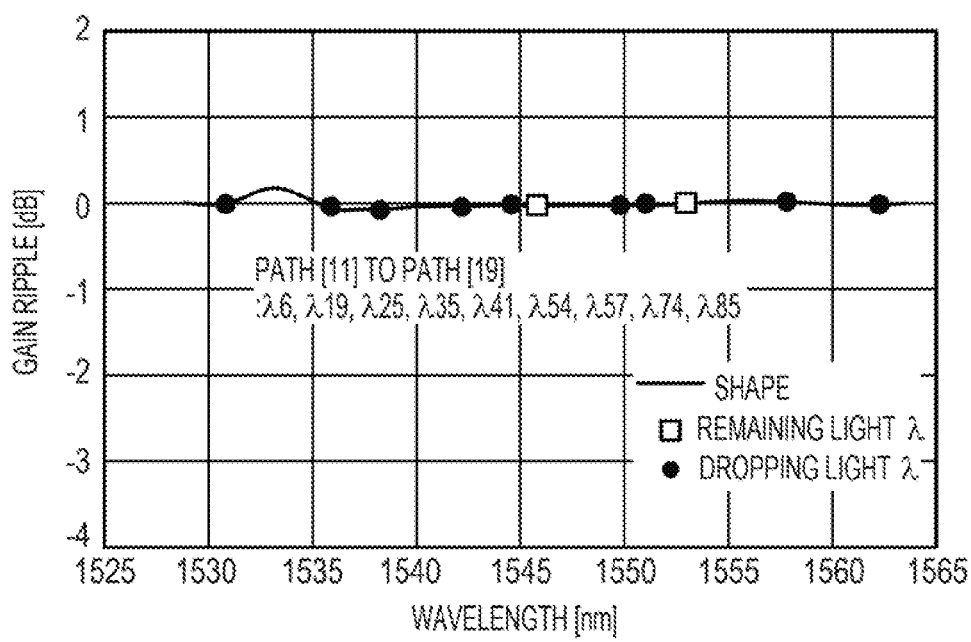
FIG. 11C is a view depicting an example of gain ripple based on the SHB from dropping light in the fifth wavelength allocation state in the optical transmission system according to the embodiment.
Figure 11D:
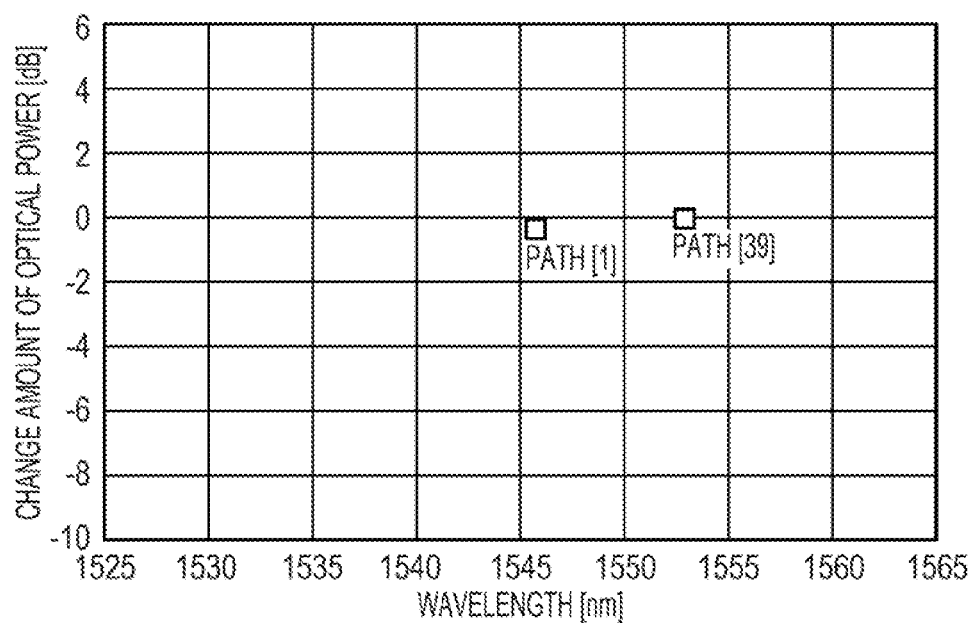
FIG. 11D is a view depicting an example of the amount of change of the optical power in a remaining path in the fifth wavelength allocation state in the optical transmission system according to the embodiment.

In the fifth wavelength allocation state, the gain ripple is estimated by calculation based on the wavelength allocation so that the gain ripples based on the SHB from the remaining light and the dropping light both become flat as a method for reducing the difference in the shapes of the gain ripples. A combination optimization method is used to select the wavelengths of each of the optical paths so as to achieve flatness. For example, path [1]:λ44=1545.72 nm, path [11] to path [19] are λ6, λ19, λ25, λ35, λ41, λ54, λ57, λ74, λ85 respectively, and path [39]:λ62=1552.93 nm, FIG. 11A is a view depicting an example of gain ripple based on the SHB from stationary light in the fifth wavelength allocation state in the optical transmission system according to the embodiment. FIG. 11B is a view depicting an example of gain ripple based on the SHB from remaining light in the fifth wavelength allocation state in the optical transmission system according to the embodiment. FIG. 11C is a view depicting an example of gain ripple based on the SHB from dropping light in the fifth wavelength allocation state in the optical transmission system according to the embodiment. FIG. 11D is a view depicting an example of the amount of change of the optical power in a remaining path in the fifth wavelength allocation state in the optical transmission system according to the embodiment. As can be seen from FIG. 11A to FIG. 11D, the gain ripple based on the SHB from the stationary light becomes flat by flattening the gain ripples based on the SHB from the remaining light and the dropping light in comparison to the related art examples in FIG. 6A to FIG. 6D. Therefore, the difference in the shapes of the gain ripples is reduced and the change in the optical power of the remaining path can be reduced.

[Sixth Wavelength Allocation State]

The sixth wavelength allocation state represents a case in which the wavelength allocations each comprising stationary light and remaining light are close to each other with equal intervals therebetween as a method for reducing the difference in the shapes of the gain ripples. For example, path [1]:$\lambda 31$=1540.56 nm, path [11] to path [19] are $\lambda 10$, $\lambda 17$, $\lambda 24$, $\lambda 38$, $\lambda 45$, $\lambda 52$, $\lambda 66$, $\lambda 73$, $\lambda 80$ respectively, and path [39]:$\lambda 59$=1551.72 nm.

Figure 12A:
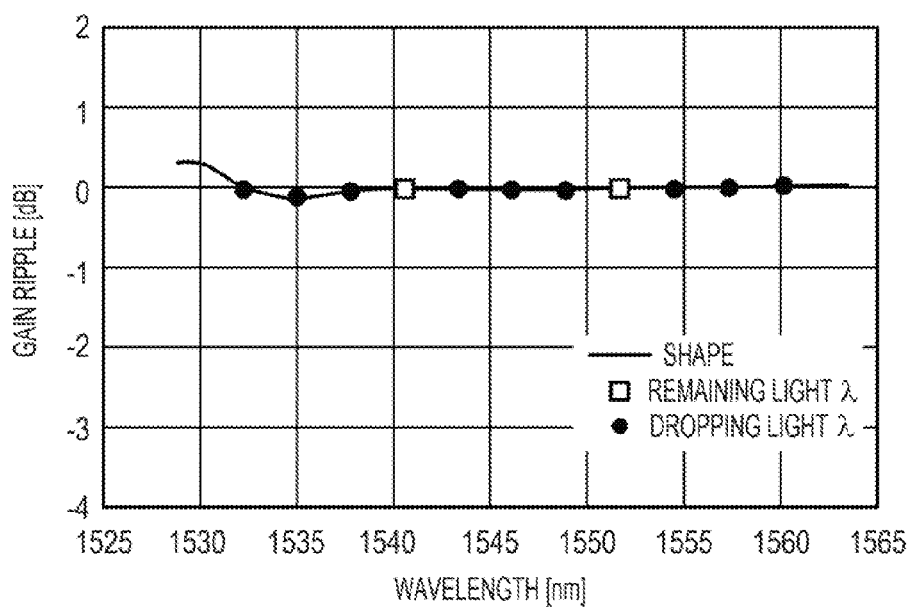
FIG. 12A is a view depicting an example of gain ripple based on the SHB from stationary light in a sixth wavelength allocation state in the optical transmission system according to the embodiment.
Figure 12B:
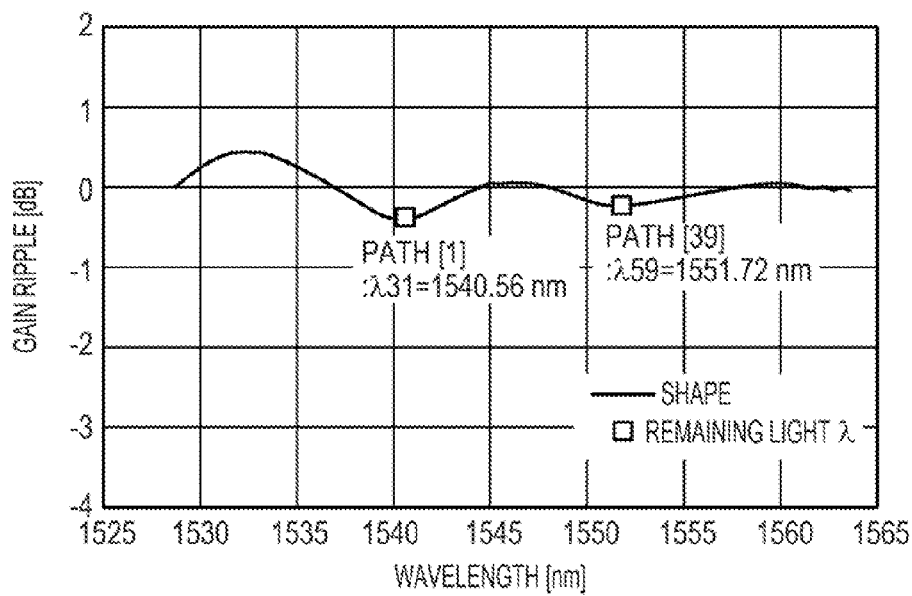
FIG. 12B is a view depicting an example of gain ripple based on the SHB from remaining light in the sixth wavelength allocation state in the optical transmission system according to the embodiment.
Figure 12C:
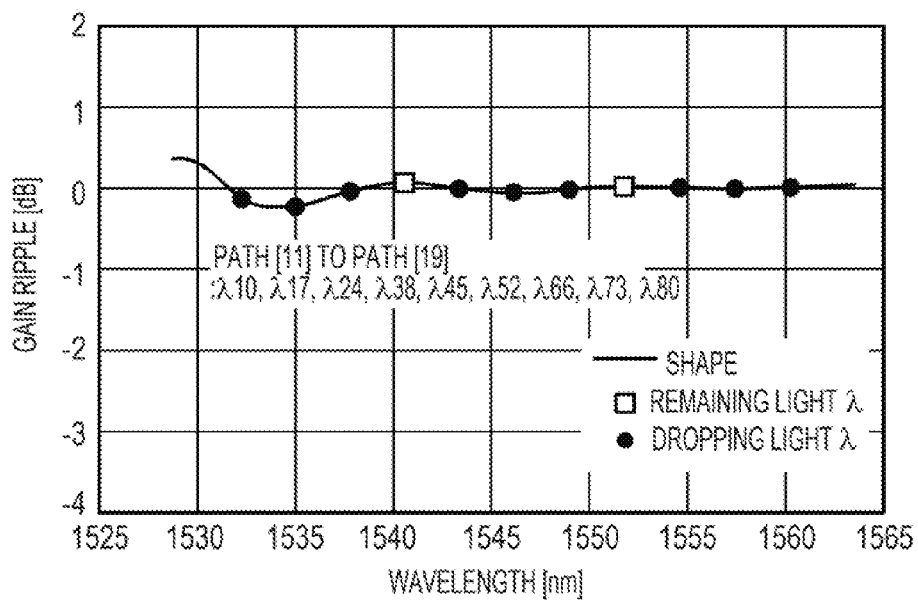
FIG. 12C is a view depicting an example of gain ripple based on the SHB from dropping light in the sixth wavelength allocation state in the optical transmission system according to the embodiment.
Figure 12D:
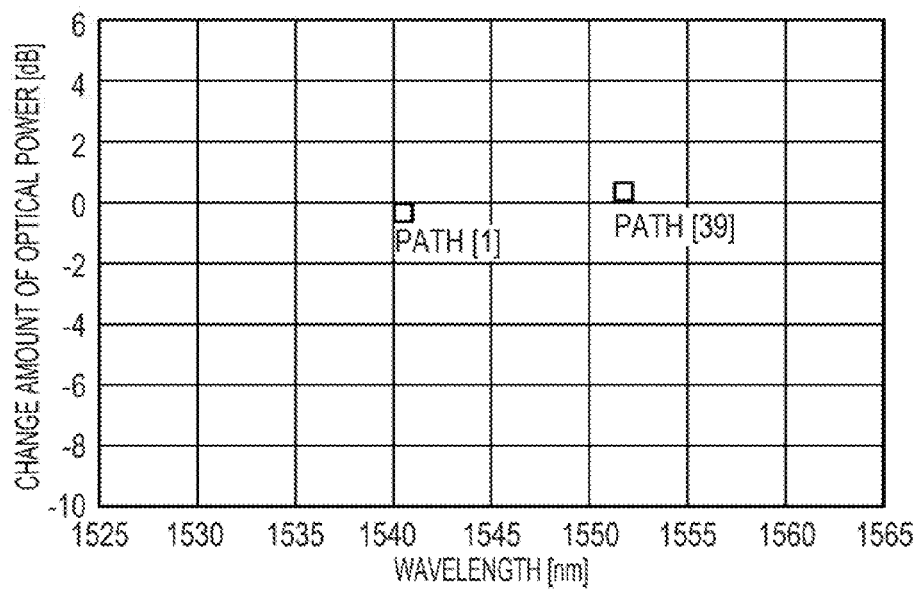
FIG. 12D is a view depicting an example of the amount of change of the optical power in a remaining path in the sixth wavelength allocation state in the optical transmission system according to the embodiment.

FIG. 12A is a view depicting an example of gain ripple based on the SHB from stationary light in the sixth wavelength allocation state in the optical transmission system according to the embodiment. FIG. 12B is a view depicting an example of gain ripple based on the SHB from remaining light in the sixth wavelength allocation state in the optical transmission system according to the embodiment. FIG. 12C is a view depicting an example of gain ripple based on the SHB from dropping light in the sixth wavelength allocation state in the optical transmission system according to the embodiment. FIG. 12D is a view depicting an example of the amount of change of the optical power in a remaining path in the sixth wavelength allocation state in the optical transmission system according to the embodiment. As can be seen in FIG. 12A to FIG. 12D, the difference in the shapes among the ripple gains is reduced and the change in the optical power of the remaining path can be reduced in comparison to the related art example in FIG. 6A to FIG. 6D.

[Seventh Wavelength Allocation State]

The seventh wavelength allocation state represents a case in which the wavelength allocations each comprising remaining light and dropping light are close to each other with equal intervals therebetween as a method for reducing the difference in the shapes of the gain ripples. For example, path [1]:$\lambda 30$=1540.16 nm, path [11] to path [19] are $\lambda 9$, $\lambda 18$, $\lambda 27$, $\lambda 36$, $\lambda 45$, $\lambda 54$, $\lambda 63$, $\lambda 72$, $\lambda 81$ respectively, and path [39]:$\lambda 60$=1552.12 nm.

Figure 13A:
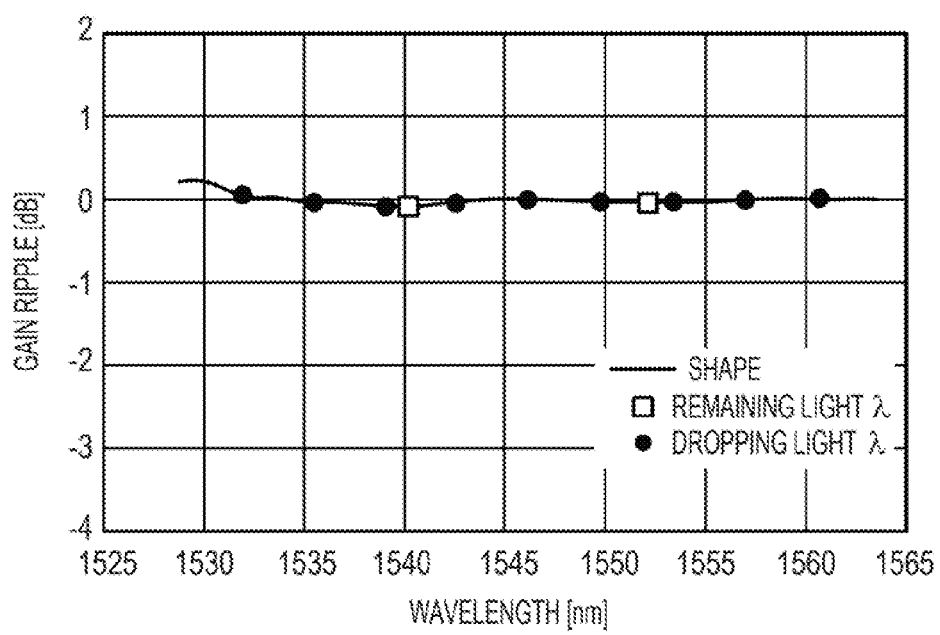
FIG. 13A is a view depicting an example of gain ripple based on the SHB from stationary light in a seventh wavelength allocation state in the optical transmission system according to the embodiment.
Figure 13B:
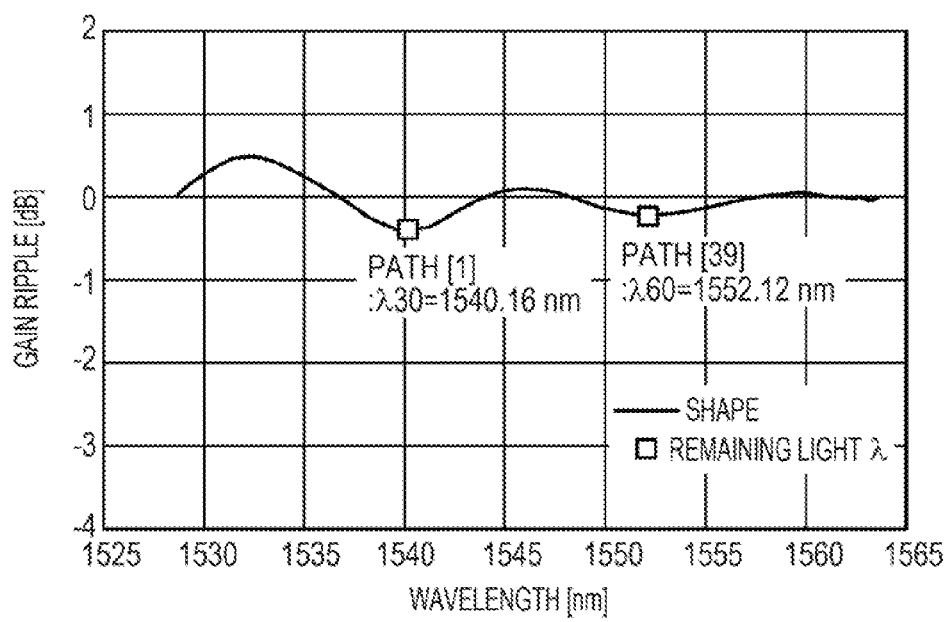
FIG. 13B is a view depicting an example of gain ripple based on the SHB from remaining light in the seventh wavelength allocation state in the optical transmission system according to the embodiment.
Figure 13C:
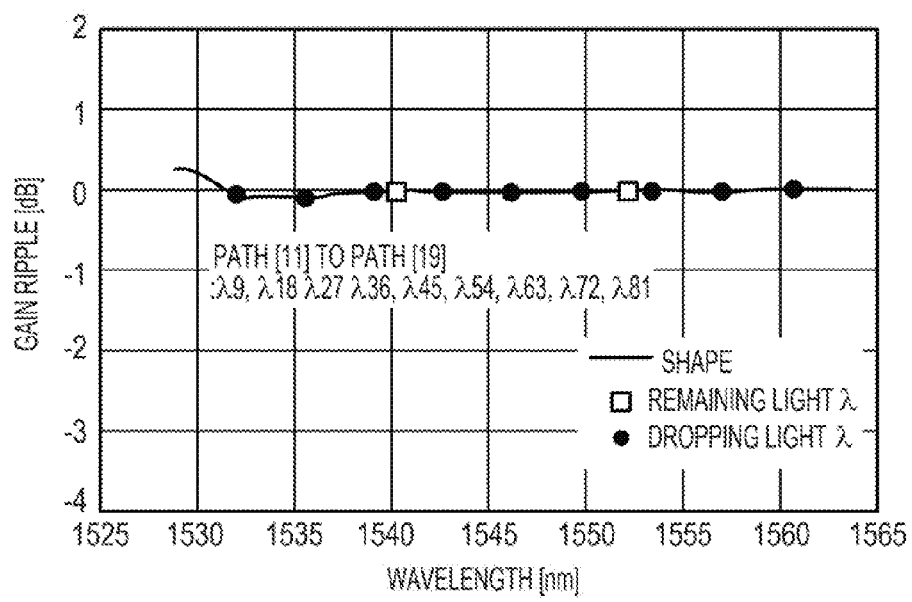
FIG. 13C is a view depicting an example of gain ripple based on the SHB from dropping light in the seventh wavelength allocation state in the optical transmission system according to the embodiment.
Figure 13D:
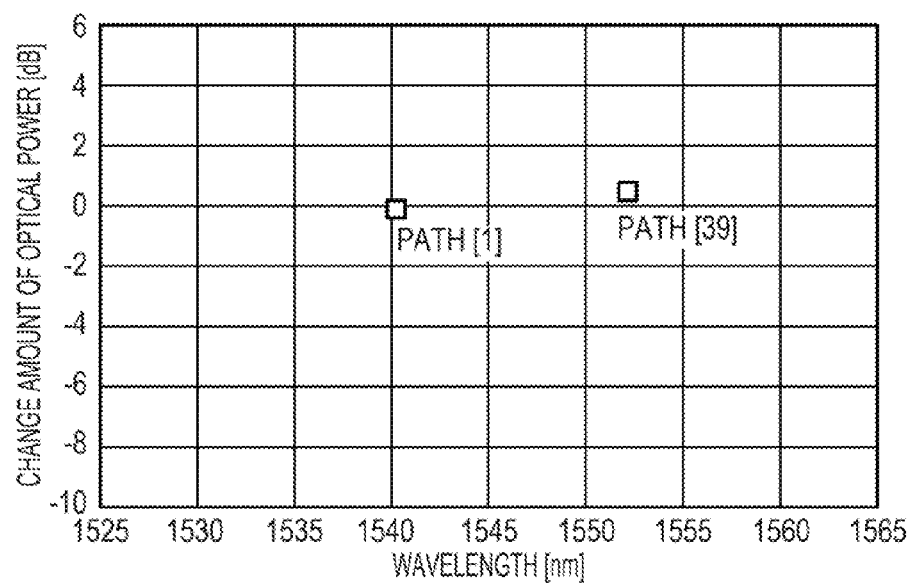
FIG. 13D is a view depicting an example of the amount of change of the optical power in a remaining path in the seventh wavelength allocation state in the optical transmission system according to the embodiment.

FIG. 13A is a view depicting an example of gain ripple based on the SHB from stationary light in the seventh wavelength allocation state in the optical transmission system according to the embodiment. FIG. 13B is a view depicting an example of gain ripple based on the SHB from remaining light in the seventh wavelength allocation state in the optical transmission system according to the embodiment. FIG. 13C is a view depicting an example of gain ripple based on the SHB from dropping light in the seventh wavelength allocation state in the optical transmission system according to the embodiment. FIG. 13D is a view depicting an example of the amount of change of the optical power in a remaining path in the seventh wavelength allocation state in the optical transmission system according to the embodiment. As can be seen in FIG. 13A to FIG. 13D, the difference in the shapes among the ripple gains is reduced, and the change in the optical power of the remaining path can be reduced in comparison to the related art example in FIG. 6A to FIG. 6D.

[Eighth Wavelength Allocation State]

The eighth wavelength allocation state is predicated on the configuration of the optical transmission system 1B as illustrated in FIG. 4B. Moreover, the eighth wavelength allocation state is predicated on the fact that there are eight OMS disconnection candidates, there are 39 optical paths in total which can be classified into the four routes A to D, there are 12 combinations in which the OMS wavelength allocations are changed, and optical paths are added in the order of time according to the number "n" in path [n] and are not erased.

In the eighth wavelength allocation state, the gain ripple is estimated by calculation based on the wavelength allocation so that the gain ripples based on the SHB from the remaining light and the dropping light both become flat as a method for reducing the difference in the shapes of the gain ripples. A combination optimization method is then used to select the wavelengths of each of the optical paths so as to achieve flatness. Furthermore the wavelength of the optical paths are selected so that a flat gain ripple is achieved at the respective points in time of the optical path adding operations. For example, path [1]:$\lambda 39$=1543.73 nm, path [11] to path [19] are $\lambda 12$, $\lambda 27$, $\lambda 35$, $\lambda 42$, $\lambda 51$, $\lambda 70$, $\lambda 75$, $\lambda 80$, $\lambda 84$ respectively, and path [39]:$\lambda 62$=1552.93 nm.

Figure 14A:
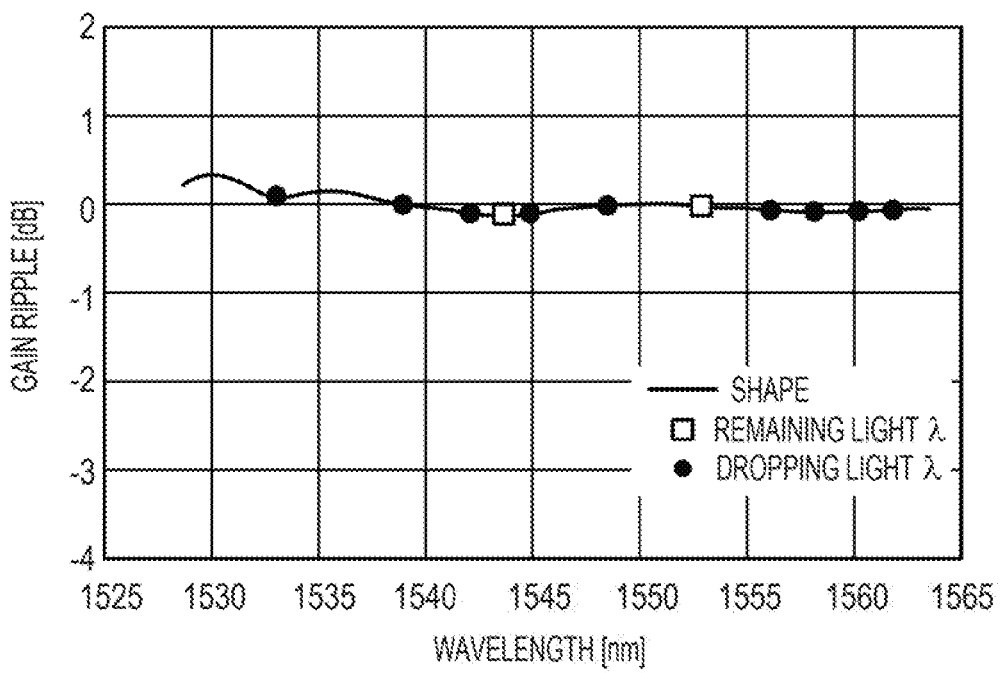
FIG. 14A is a view depicting an example of gain ripple based on the SHB from stationary light in an eighth wavelength allocation state in the optical transmission system according to the embodiment.
Figure 14B:
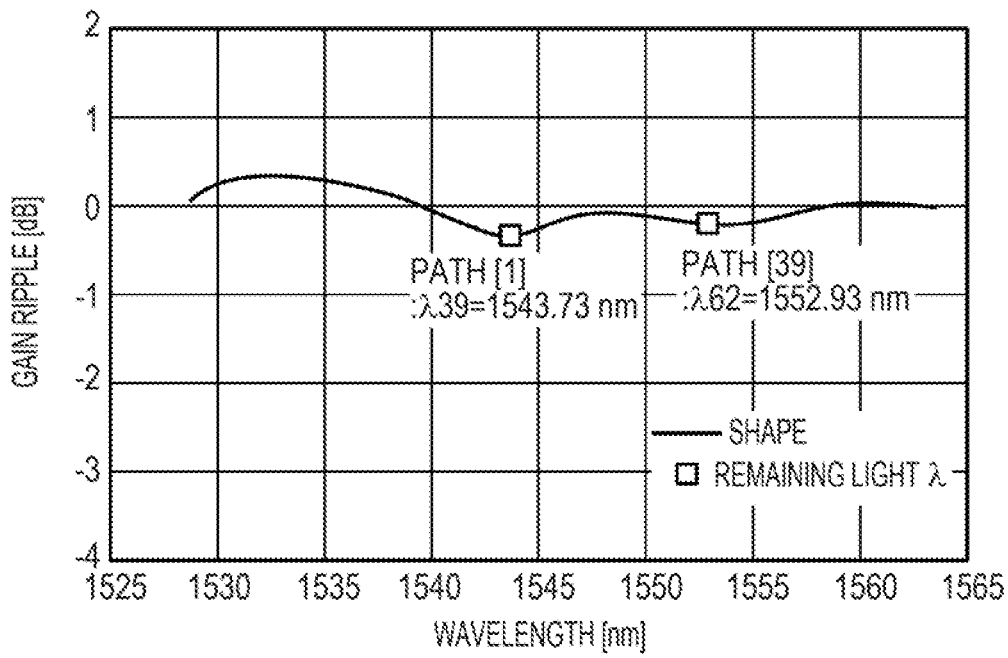
FIG. 14B is a view depicting an example of gain ripple based on the SHB from remaining light in the eighth wavelength allocation state in the optical transmission system according to the embodiment.
Figure 14C:
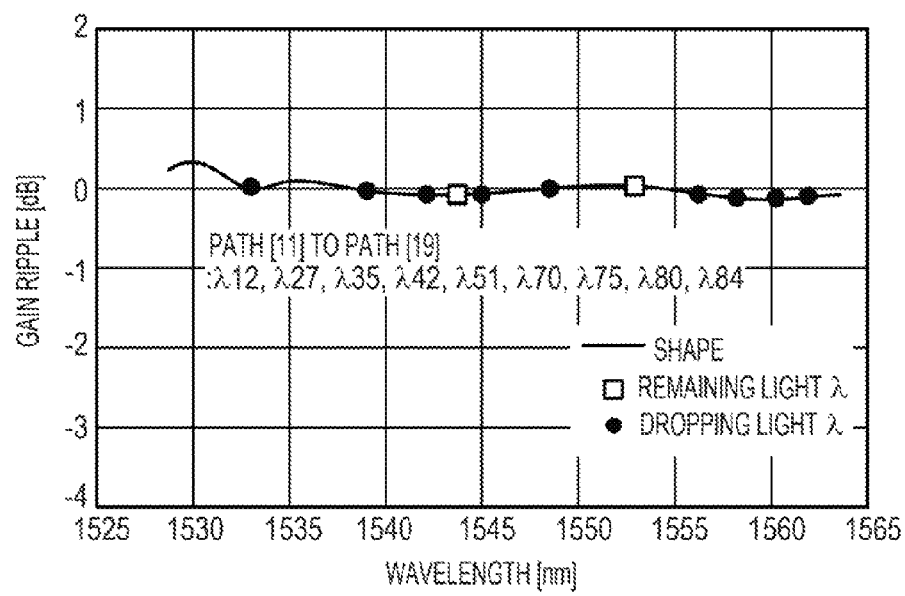
FIG. 14C is a view depicting an example of gain ripple based on the SHB from dropping light in the eighth wavelength allocation state in the optical transmission system according to the embodiment.
Figure 14D:
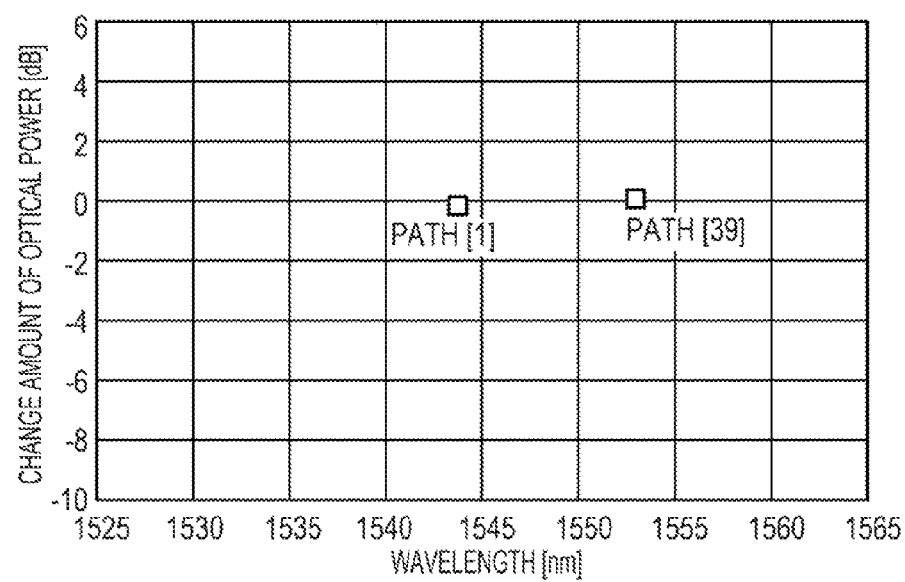
FIG. 14D is a view depicting an example of the amount of change of the optical power in a remaining path in the eighth wavelength allocation state in the optical transmission system according to the embodiment.

FIG. 14A is a view depicting an example of gain ripple based on the SHB from stationary light in the eighth wavelength allocation state in the optical transmission system according to the embodiment. FIG. 14B is a view depicting an example of gain ripple based on the SHB from remaining light in the eighth wavelength allocation state in the optical transmission system according to the embodiment. FIG. 14C is a view depicting an example of gain ripple based on the SHB from dropping light in the eighth wavelength allocation state in the optical transmission system according to the embodiment. FIG. 14D is a view depicting an example of the amount of change of the optical power in a remaining path in the eighth wavelength allocation state in the optical transmission system according to the embodiment.

As can be seen in FIG. 14A to FIG. 14D, the gain ripple is flat and the optical power of the remaining path can be reduced in the same way when compared to the fifth wavelength allocation state in comparison to the related art examples depicted in FIG. 6A to FIG. 6D. That is, it can be seen in the embodiment that the effect is not reduced even when the topology of the optical transmission system is complex.

The above embodiment makes a list of changes (for example, disconnections and the like of OMS's including transmission lines) in the wavelength allocation. The optical path is grouped into a "remaining path" and a "dropping path" for each of the cases of the candidates of wavelength allocation changes. The wavelength allocations for each candidate and each OMS of the wavelength allocation changes are grouped into "wavelength allocations comprising remaining paths" and "wavelength allocations comprising dropping paths". The gain ripples are broken down into "the gain ripple based on SHB from remaining light" and "the gain ripple based on SHB from dropping light" in addition to "the gain ripple based on SHB from stationary light (both remaining light and dropping light)" which are gain ripples based on SHB of the EDFAs in the OMS's. Moreover, two of the gain ripples among the three gain ripples are considered with regard to each candidate and each OMS of the wavelength allocation changes, and wavelengths allocated to the optical paths are selected so as to reduce the difference in the shapes of the gain ripples. The three gain ripples include "the gain ripple based on SHB from stationary light", "the gain ripple based on SHB from remaining light" and "the gain ripple based on SHB from dropping light".

Therefore, according to the above embodiment, changes can be limited in the optical power caused by changes in the gain ripples based on the SHB at the EDFAs following the changes in the wavelength allocation brought about by the disconnection of the OMS including the transmission line. The optical paths are then classified into the "remaining path" and the "dropping path". The difference in the shapes (wavelength characteristics) of any two among "the gain ripple based on SHB from stationary light", "the gain ripple based on SHB from remaining light" and "the gain ripple based on SHB from dropping light" is reduced. As a result, the amount of change of the gain ripple following the change in the wavelength allocation is reduced, and the occurrence of reception errors of the optical signals in receivers following changes in the optical power input into the receivers connected to the ROADM nodes on the receiving side, can be avoided.

The constituent elements of the illustrated devices in the above embodiments are not necessarily configured physically as illustrated. In other words, the embodiment is not limited to the particular forms of distribution and integration of each part and all or some of the parts may be configured to be functionally or physically distributed or integrated in arbitrary units according to the type of load or usage conditions and the like.

All of or arbitrary portions of the various functional processes carried out by the devices may be executed by a central processing unit (CPU). Alternatively, the various functional processes carried out by the devices may be carried out as a whole or partially on a microcomputer such as an NP, an MPU, an MCU, an ASIC, or an FPGA and the like. NP stands for a network processor, MPU stands for a microprocessing unit, MCU stands for a microcontroller unit, ASIC stands for an application specific integrated circuit, and FPGA stands for a field-programmable gate array. Moreover, various processing functions may also be conducted in part or in total on a program that conducts analysis with the CPU (or a micro-computer such as an MPU or MCU), or on hardware based on wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission control device configured to control an optical transmission system including optical transmission devices configured to wavelength-multiplex, amplify and transmit optical signals, and wavelength-multiplexed transmission sections through which the optical transmission devices are coupled, the optical transmission control device comprising:
   a memory: and
   a processor coupled to the memory and the processor configured to:
   aggregate information of candidacy sections having a possibility that communication is discontinued among wavelength-multiplexed transmission sections,
   classify, based on the aggregated information, optical paths set between the optical transmission devices into a first optical path on which, when communication in the candidacy sections is discontinued, an optical signal of the optical signals is not transmitted, and a second optical path on which, when the communication in the candidacy sections is discontinued, an optical signal of the optical signals is transmitted, both of the first optical path and the second optical path being included in the optical paths set between the optical transmission devices, and
   determine a wavelength allocation in a first wavelength group of the first optical path and a second wavelength group of the second optical path so that a difference in gain wavelength characteristics of the first optical path and the second optical path is equal to or less than a predetermined level.

2. The optical transmission control device according to claim 1,
   wherein the processor is configured to determine the wavelength allocation of the optical signals on the first optical path and on the second optical path so that a wavelength spacing of the optical signals is equal to or less than a predetermined value.

3. The optical transmission control device according to claim 1,
   wherein the processor is configured to determine the wavelength allocation of the optical signals on the first optical path and on the second optical path so as to form a plurality of first wavelength groups of the first wavelength group and a plurality of second wavelength groups of the second wavelength group, in which a wavelength spacing is equal to or less than a predetermined level.

4. The optical transmission control device according to claim 1,
   wherein the processor is configured to determine the wavelength allocation of the optical signals on the first optical path and on the second optical path so that the gain wavelength characteristics of the first optical path and the second optical path are fixed within a first predetermined range.

5. The optical transmission control device according to claim 4,
   wherein the processor is configured to determine the wavelength allocation of the optical signal on the first optical path and on the second optical path so that a wavelength spacing of the optical signals is fixed within a second predetermined range.

6. An optical signal wavelength determination method of an optical transmission control device configured to control an optical transmission system including optical transmission devices configured to wavelength-multiplex, amplify and transmit optical signals, and wavelength-multiplexed transmission sections through which the optical transmission devices are coupled, the optical signal wavelength determination method comprising:
   aggregating information of candidacy sections having a possibility that communication is discontinued among wavelength-multiplexed transmission sections;
   classifying, based on the aggregated information, optical paths set between the optical transmission devices into a first optical path on which, when communication in the candidacy sections is discontinued, an optical signal of the optical signals is not transmitted, and a second optical path on which, when the communication in the candidacy sections is discontinued, an optical signal of the optical signals is transmitted, both of the first optical path and the second optical path being included in the optical paths set between the optical transmission devices; and determining a wavelength allocation in a first wavelength group of the first optical path and a second wavelength group of the second optical path so that a difference in gain wavelength characteristics of the first optical path and the second optical path is equal to or less than a predetermined level, by a processor.

* * * * *